United States Patent
Okada et al.

(10) Patent No.: US 6,266,576 B1
(45) Date of Patent: Jul. 24, 2001

(54) LEGGED MOVING ROBOT

(75) Inventors: Yasushi Okada; Toru Takenaka; Kenichi Ogawa; Naohide Ogawa; Nobuaki Ozawa, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,594

(22) Filed: May 11, 1999

(30) Foreign Application Priority Data

| May 11, 1998 | (JP) | 10-127163 |
| Jun. 23, 1998 | (JP) | 10-176346 |
| Jun. 23, 1998 | (JP) | 10-176347 |
| Sep. 25, 1998 | (JP) | 10-271410 |

(51) Int. Cl.$^7$ ..................................... G06F 19/00
(52) U.S. Cl. ............... 700/245; 700/44; 700/56; 700/85; 700/258; 700/260; 700/264; 701/23; 318/568.12; 414/5; 414/730
(58) Field of Search ................. 700/260, 245, 700/258, 44, 264, 85, 56; 701/23, 301, 213, 217, 221, 214, 215, 226; 318/568.12, 675, 568.11, 587; 702/150, 152; 901/1, 9, 33; 414/5, 730; 342/357.08–357.14; 446/355

(56) References Cited

U.S. PATENT DOCUMENTS

| 4,119,900 | * | 10/1978 | Kremintz | 701/23 |
| 4,565,487 | * | 1/1986 | Kroczynski | 414/730 |
| 5,459,659 | * | 10/1995 | Takenaka | 700/260 |
| 5,808,433 | * | 9/1998 | Tagami et al. | 318/568.12 |

FOREIGN PATENT DOCUMENTS

| 02000006060 | * | 1/2000 | (JP) . |
| 02000003585 | * | 2/2000 | (JP) . |

OTHER PUBLICATIONS

Lian, Legged Robot, IEEE., 1995, IEEE., pp. 1297–1302.*
Pannu et al., Stability of a One Legged Robot using U–Synthesis, 1995, IEEE., pp. 685–690.*
Galt, Solutions for Semi–Autonomous Legged Robots, 1996, IEEE., pp. 9/1–9/4.*
Gregorio et al., Design, Control, and Energetics of an Electrically Actuated Legged Rbot, 1997, IEEE., pp. 626–634.*
Kitano et al., Sony Legged Robot for RboCup Challenge, 1998, IEEE., pp. 2605–2612.*
Veloso et al., Playing Soccer with Legged Robots, 1998, IEEE., pp. 437–442.*
L□ffler et al., Control of a Biped Jogging Rbot, 2000, pp. 6001–605.*
Gienger et al., A Biped Robot that Jogs, 2000, IEEE., pp. 3334–3339.*

* cited by examiner

Primary Examiner—William A Cuchlinski, Jr.
Assistant Examiner—McDieunel Marc
(74) Attorney, Agent, or Firm—Arent Fox Kintner Plotkin & Kahn, PLLC

(57) ABSTRACT

A legged moving robot has an action plan function to operate according to a predetermined action plan. The legged moving robot has a fuel cell for supplying operating electric energy for the legged moving robot, an operation control unit for controlling operation of the legged moving robot according to the action plan, and an electric generation managing unit for monitoring a state of the fuel cell and contents of the action plan and for regulating an amount of electric energy generated by the fuel cell depending on the action plan.

17 Claims, 17 Drawing Sheets

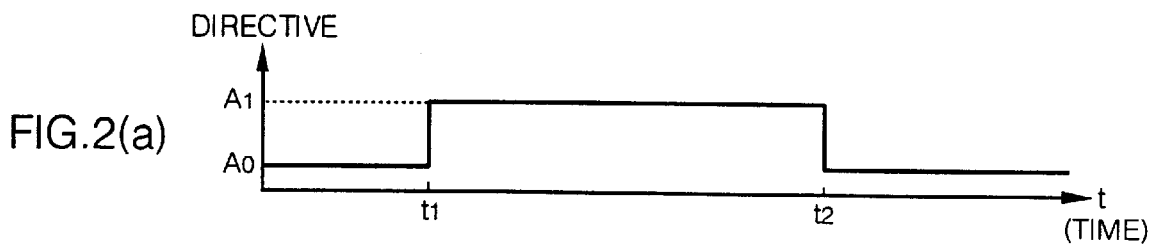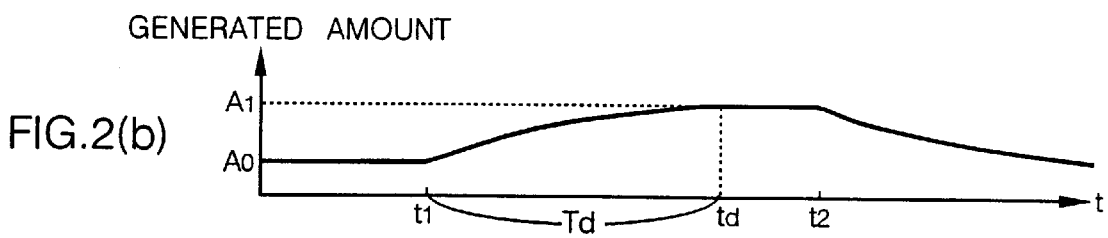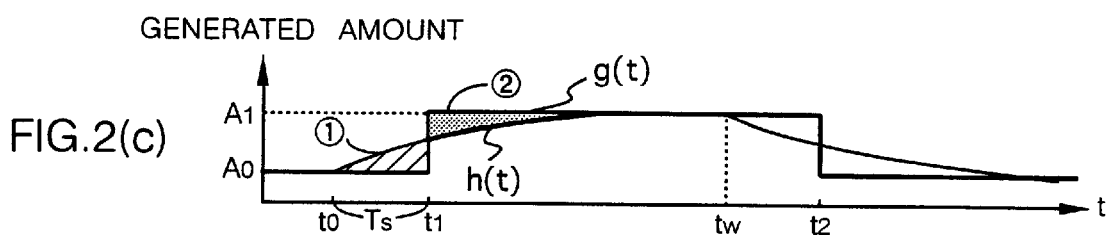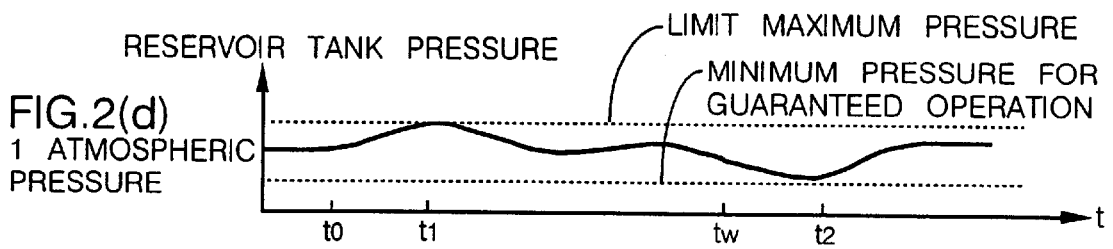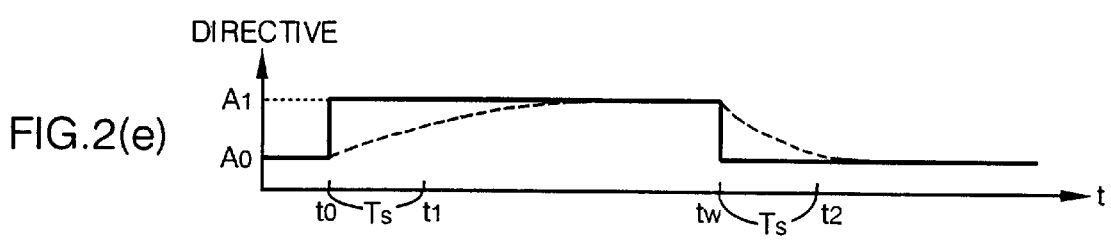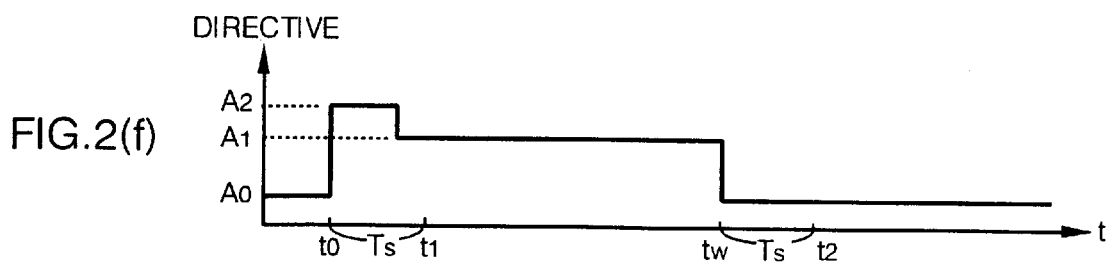

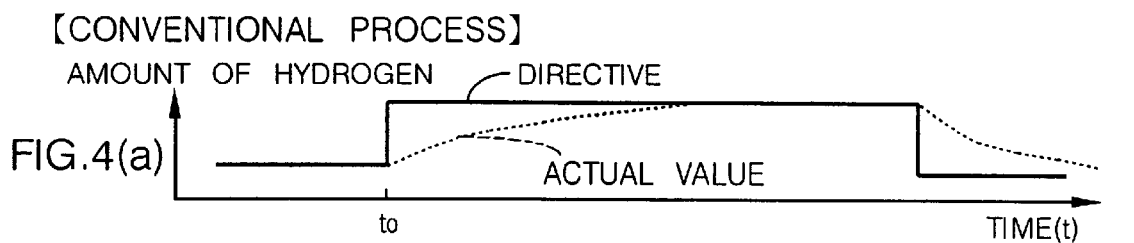

FIG.4(a) [CONVENTIONAL PROCESS] AMOUNT OF HYDROGEN — DIRECTIVE, ACTUAL VALUE vs TIME(t), starting at $t_0$

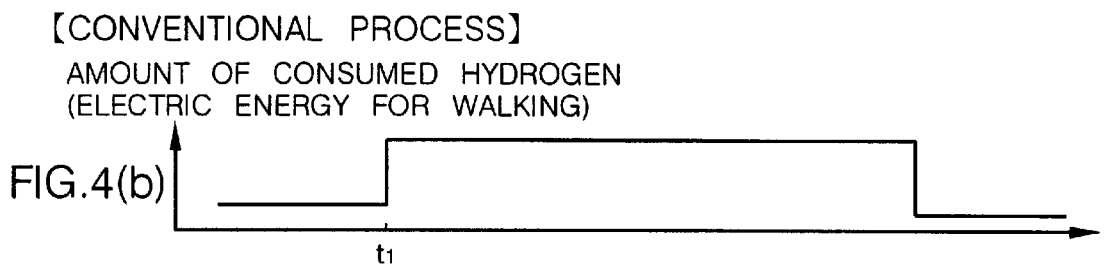

FIG.4(b) [CONVENTIONAL PROCESS] AMOUNT OF CONSUMED HYDROGEN (ELECTRIC ENERGY FOR WALKING), starting at $t_1$

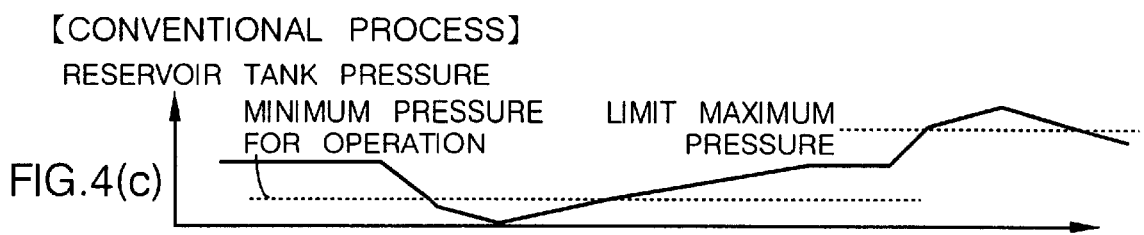

FIG.4(c) [CONVENTIONAL PROCESS] RESERVOIR TANK PRESSURE, MINIMUM PRESSURE FOR OPERATION, LIMIT MAXIMUM PRESSURE

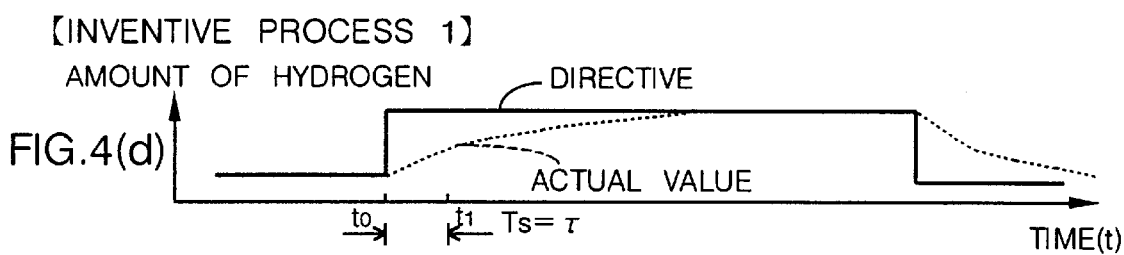

FIG.4(d) [INVENTIVE PROCESS 1] AMOUNT OF HYDROGEN — DIRECTIVE, ACTUAL VALUE, $t_0$, $t_1$, $T_s = \tau$, TIME(t)

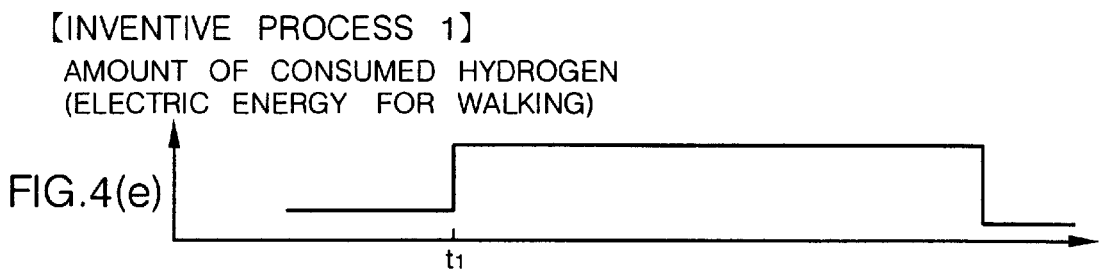

FIG.4(e) [INVENTIVE PROCESS 1] AMOUNT OF CONSUMED HYDROGEN (ELECTRIC ENERGY FOR WALKING), starting at $t_1$

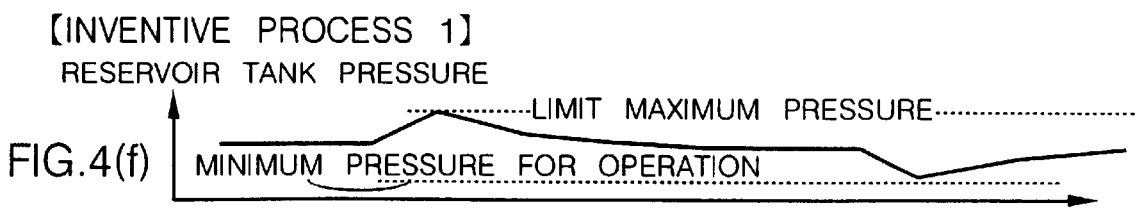

FIG.4(f) [INVENTIVE PROCESS 1] RESERVOIR TANK PRESSURE, LIMIT MAXIMUM PRESSURE, MINIMUM PRESSURE FOR OPERATION

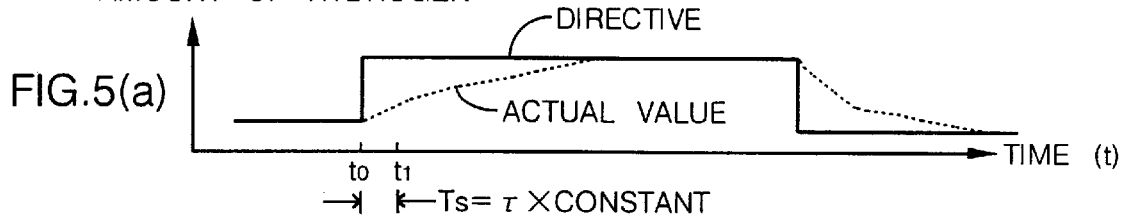
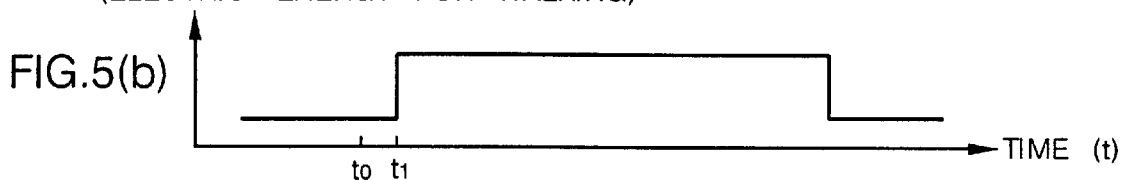
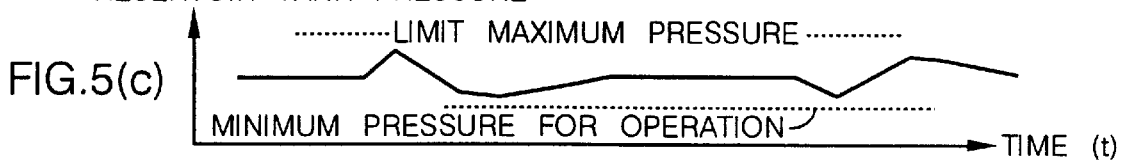

LEGGED MOVING ROBOT

BACKGROUND OF THE INVENTION

1. Field of the Invention

The present invention relates to a legged moving robot, and more particularly to a system for controlling the amount of electric energy generated by a fuel cell on a legged moving robot.

2. Description of the Related Art

Heretofore, legged moving robots have been powered by an external power supply connected via a power cable or a secondary battery such as lithium-ion battery or the like. However, a legged moving robot that is powered by an external power supply connected thereto via a power cable suffers a serious problem in that the range of movement of the legged moving robot is limited by the power cable.

A legged moving robot that is powered by a secondary battery such as lithium-ion battery or the like carried thereon is free of limitations on the range of movement thereof. However, the energy storage capacity of the secondary battery is limited because of a limited weight which can be borne by the legged moving robot. Conventionally, the energy storage capacity of secondary batteries available for use on legged moving robots has limited the continuous walking time of the legged moving robots to about 30 minutes. Furthermore, the secondary batteries have been disadvantageous in that it takes a relatively long period of time to charge the secondary batteries.

One solution would be to install an engine-operated electric generator on legged moving robots. Since, however, the engine of the electric generator emits harmful exhaust gases and causes vibrations, the engine-operated electric generator is not suitable for use on legged moving robots particularly if they operate in such environments which demand cooperation with human beings.

According to one proposal, a fuel cell which has a greater energy storage capacity per weight than lithium-ion batteries and which neither emits harmful gases nor causes vibrations is installed as a power source on a legged moving robot. The output electric energy from the fuel cell varies depending on the amount of hydrogen supplied as a fuel to the fuel cell.

Hydrogen is generated by a reformer from a fuel such as methanol or the like by way of a chemical reaction. The amount of hydrogen generated by the reformer can be increased by increasing the temperature of a heater of the reformer or increasing both the amount of air supplied to the reformer and the amount of a fossil fuel supplied to the reformer to increase the pressure for thereby accelerating the chemical reaction. For this reason, after the reformer is instructed to increase the amount of hydrogen generated thereby, it takes a certain period of time or time delay before the amount of hydrogen generated by the reformer is actually increased.

When the load on an actuating system including a motor on the legged moving robot is abruptly increased as when the legged moving robot starts walking, the reformer is instructed to increase the amount of hydrogen generated thereby for enabling the fuel cell to generate electric energy large enough to meet the load. However, on account of the above time delay, the amount of hydrogen supplied to the fuel cell does not immediately increase, possibly resulting in a shortage of electric energy supplied from the fuel cell to the actuating system.

In order to eliminate the above time delay, a reservoir tank for storing hydrogen may be connected to a fuel passage extending from the reformer to the fuel cell. The reservoir tank needs to be of a sufficiently large size to be able to supply an amount of fuel to the fuel cell which can meet the abrupt increase in the load as when the legged moving robot starts walking because the legged moving robot consumes largely different amounts of electric energy when it is at rest and when it is walking. The large-size reservoir tank requires a large installation space and is relatively heavy.

SUMMARY OF THE INVENTION

It is therefore an object of the present invention to provide a legged moving robot which does not have a large-size reservoir tank and which prevents a shortage of electric energy from a fuel cell when the load on an actuating system of the robot is abruptly increased.

To achieve the above object, there is provided in accordance with the present invention a legged moving robot having an action plan function to operate according to a predetermined action plan, comprising a fuel cell for supplying operating electric energy for the legged moving robot, operation control means for controlling operation of the legged moving robot according to the action plan, and electric generation managing means for monitoring a state of the fuel cell and contents of the action plan and for regulating an amount of electric energy generated by the fuel cell depending on the action plan.

The legged moving robot is controlled in its operation according to the action plan by the operation control means. The electric generation managing means monitors both a state of the fuel cell and contents of the action plan, and regulates an amount of electric energy generated by the fuel cell depending on the action plan. When the action plan is executed, the electric generation managing means control the amount of electric energy generated by the fuel cell so as not to bring about a shortage of the output electric energy from the fuel cell. The fuel cell which has a large energy storage capacity per weight can be used as the power supply of the legged moving robot.

The legged moving robot may further comprise raw material storage means for storing a raw material from which to generate a fuel for the fuel cell, and a reformer for generating the fuel for the fuel cell from the raw material supplied from the raw material storage means and supplying the generated fuel to the fuel cell, the electric generation managing means comprising means for directing a change in an amount of the fuel to be generated to the reformer depending on an amount of the fuel consumed by the fuel cell, analyzing the contents of the action plan before the action plan is executed, and, if it is recognized from the action plan that the legged moving robot will operate under a large load requiring at least a predetermined level of electric energy from the fuel cell, carrying out an anticipatory process to direct the reformer to increase the amount of the fuel to be generated thereby before the legged moving robot operates under the large load.

If it is recognized from the action plan that the legged moving robot will operate under a large load, then the electric generation managing means directs the reformer to increase the amount of the fuel to be generated thereby. Therefore, before the legged moving robot operates under the large load, the amount of the fuel supplied from the reformer to the fuel cell can be increased. In this manner, a shortage of the output electric energy from the fuel cell is prevented when the legged moving robot operates under the large load. A large-size reservoir tank for storing the fuel is not required to provide against the operation of the legged moving robot under the large load.

The legged moving robot may further comprise a reservoir tank for storing the fuel generated by the reformer and supplying the fuel to the fuel cell, the electric generation managing means comprising means for carrying out the anticipatory process so that a pressure in the reservoir tank will not exceed a predetermined upper pressure limit.

When the anticipatory process is performed, the pressure in the reservoir tank increases progressively due to the fuel supplied from the reformer. If the pressure in the reservoir tank exceeds an upper pressure limit of the reservoir tank, then the reservoir tank will be liable to be damaged.

The anticipatory process is carried out so that the pressure in the reservoir tank will not exceed the upper pressure limit, for thereby preventing the reservoir tank from being damaged. Since the pressure in the reservoir tank does not exceed the upper pressure limit in the anticipatory process, the reservoir tank may be of a minimum size required depending on the upper pressure limit. Since any marginal volume which needs to be provided in the reservoir tank may be small, the reservoir tank may be relatively small and light.

The electric generation managing means may comprise means for determining, depending on at least reaction delay characteristics of the reformer, a preparation time estimated after the reformer is directed to increase the amount of the fuel to be generated thereby so that the amount of the fuel supplied from the reformer to the fuel cell will be at least a required amount depending on the operation of the legged moving robot under the large load, until a target amount of the fuel established depending on the required amount is actually generated by the reformer, and directing the operation control means to start operating the legged moving robot under the large load upon elapse of the preparation time after the reformer is directed to increase the amount of the fuel to be generated thereby.

Upon elapse of the preparation time, i.e., when the amount of the fuel generated by the reformer is estimated to have reached the target amount of the fuel, the electric generation managing means directs the operation control means to start operating the legged moving robot under the large load. Consequently, when the legged moving robot operates under the large load, a shortage of the output electric energy of the fuel cell is prevented from occurring.

The legged moving robot may further comprise generated fuel amount grasping means for grasping an amount of the fuel generated by the reformer, the electric generation managing means comprising means for determining an extent to which the reformer is directed to increase the amount of the fuel to be generated thereby, depending on at least the amount of the fuel generated by the reformer as grasped by the generated fuel amount grasping means in the anticipatory process for supplying the required amount of the fuel.

The electric generation managing means corrects the extent to which the reformer is directed to increase the amount of the fuel to be generated thereby, depending on the amount of the fuel generated by the reformer as grasped by the generated fuel amount grasping means. Therefore, before the preparation time elapses, the amount of the fuel generated by the reformer can reliably be increased up to the target amount of the fuel.

The generated fuel amount grasping means may comprise means for grasping the amount of the fuel generated by the reformer from the amount of electric energy generated by the fuel cell, a temperature in the reformer, and a pressure at which the fuel is supplied from the reformer.

The reformer supplies the fuel cell with not only the fuel but also gases including a water vapor generated when the fuel is generated. It is therefore difficult to directly detect the amount of the supplied fuel. The generated fuel amount grasping means estimates the amount of the fuel generated by the reformer indirectly from the amount of electric energy generated by the fuel cell, the temperature in the reformer, and the pressure at which the fuel is supplied from the reformer. Therefore, the amount of the fuel generated by the reformer can easily be grasped.

The legged moving robot may further comprise generated fuel amount grasping means for grasping an amount of the fuel generated by the reformer, the electric generation managing means comprising means for directing the reformer to increase the amount of the fuel generated thereby so that the amount of the fuel supplied from the reformer to the fuel cell will be at least a required amount depending on the operation of the legged moving robot under the large load, and directing the operation control means to start operating the legged moving robot under the large load when the amount of the fuel generated by the reformer as grasped by the generated fuel amount grasping means reaches at least a target amount of the fuel established depending on the required amount after the reformer is directed to increase the amount of the fuel generated thereby in the anticipatory process.

The electric generation managing means directs the operation control means to start operating the legged moving robot under the large load when the amount of the fuel generated by the reformer as grasped by the generated fuel amount grasping means reaches at least a target amount of the fuel in the anticipatory process. The legged moving robot is thus prevented from operating under the large load while the amount of the fuel supplied from the reformer to the fuel cell is insufficient.

The electric generation managing means may comprise means for directing the reformer to increase the amount of the fuel generated thereby so that the amount of the fuel supplied from the reformer to the fuel cell will be at least a required amount depending on the operation of the legged moving robot under the large load, thereafter calculating a preparation time estimated until the target amount of the fuel established depending on the required amount is actually generated by the reformer, and directing the operation control means to start operating the legged moving robot under the large load when the amount of the fuel generated by the reformer as grasped by the generated fuel amount grasping means reaches at least the target amount of the fuel or when the preparation time has elapsed after the reformer is directed to increase the amount of the fuel generated thereby in the anticipatory process.

If the electric generation managing means fails to operate, then even though the amount of the fuel generated by the reformer actually increases because the reformer is directed to increase the amount of the fuel generated thereby, the amount of the fuel generated by the reformer as grasped by the generated fuel amount grasping means does not increase, and may not reach the target amount.

In such a case, when the preparation time has elapsed after the reformer is directed to increase the amount of the fuel generated thereby, the amount of the fuel generated by the reformer is estimated to have increased to at least the target amount. When the preparation time has elapsed after the reformer is directed to increase the amount of the fuel generated thereby, the electric generation managing means directs the operation control means to start operating the legged moving robot under the large load even if the amount of the fuel generated by the reformer as grasped by the generated fuel amount grasping means has not reached the target amount. Consequently, the legged moving robot is prevented from failing to operate due to a failure of the generated fuel amount grasping means.

The legged moving robot may further comprise electric energy storage means for being charged by the electric energy outputted from the fuel cell and supplying the operating electric energy.

Generally, the fuel cell may possibly fail to supply a sufficient amount of electric energy to operate the legged moving robot under the large load because the fuel cell has a relatively low level of instantaneous maximum output electric energy. According to the present invention, the electric energy storage means charged by the electric energy outputted from the fuel cell supplies the operating electric energy to the legged moving robot. Inasmuch as the instantaneous maximum output electric energy of the electric energy storage means can be made greater than the instantaneous maximum output electric energy of the fuel cell, the electric energy storage means can supply an amount of electric energy large enough to operate the legged moving robot under the large load.

The legged moving robot may further comprise fuel supply means for supplying a fuel to the fuel cell, fuel cell starting means for starting to activate the fuel cell, and charging means for generating a charging current from output electric energy from the fuel cell and charging the electric energy storage means with the charging current, the fuel cell starting means comprising means for starting to activate the fuel cell with output electric energy from the electric energy storage means, the operation control means comprising means for stopping supplying the operating electric energy from the electric energy storage means to the legged moving robot after the electric energy storage means is charged up to a reference voltage close to a maximum rated voltage of the electric energy storage means by the charging means, when the fuel cell is to stop operating to finish operation of the legged moving robot.

The operation control means stops supplying the operating electric energy from the electric energy storage means to the legged moving robot after the electric energy storage means is charged up to a reference voltage close to a maximum rated voltage of the electric energy storage means. Therefore, when the fuel cell is inactivated, the electric energy storage means is fully charged. Although the remaining amount of electric energy stored in the electric energy storage means decreases due to a natural discharge until the fuel cell is restarted, the electric energy supplied from the electric energy storage means to the fuel cell starting means is prevented from suffering a shortage, and hence the fuel cell is prevented from failing to be restarted.

If the legged moving robot has fuel supply means detachably connected to the fuel cell, for supplying a fuel to the fuel cell, then any remaining amount of the fuel in the fuel supply means may possibly be reduced to a very low level during operation of the legged moving robot. Thus, the fuel supply means should preferably be replaced without inactivating the legged moving robot.

In order to be able to replace the fuel supply means without stopping the operation of the legged moving robot, an arrangement for charging the electric energy storage means according to a first aspect of the present invention has charging means for generating a first charging current from output electric energy from the fuel cell and charging the electric energy storage means with the first charging current, an external power supply for generating a second charging current, and auxiliary charging means detachably connected to the external power supply, for charging the electric energy storage means with the second charging current from the external power supply.

According to the above first aspect, when the external power supply is connected to the auxiliary charging means, the electric energy storage means can be charged with the second charging current. Even when the fuel cell is inactivated to allow the fuel supply means to be replaced, the electric energy storage means can continuously be charged with the second charging current. Therefore, the fuel supply means can be replaced without stopping the operation of the legged moving robot.

An arrangement for charging the electric energy storage means according to a second aspect of the present invention has charging means for generating a charging current from output electric energy from the fuel cell and charging the electric energy storage means with the charging current, an external power supply for supplying electric energy, and auxiliary power supply means detachably connected to the external power supply, for operating the charging means with the electric energy supplied from the external power supply to generate the charging current.

According to the above second aspect, when the external power supply is connected to the auxiliary power supply means, the charging means can be activated by the electric energy supplied from the external power supply. Even when the fuel cell is inactivated to allow the fuel supply means to be replaced, the electric energy storage means can continuously be charged by the charging means. Therefore, the fuel supply means can be replaced without stopping the operation of the legged moving robot.

In each of the first and second aspects of the present invention, the fuel cell starts to be activated by the output electric energy of the electric energy storage means. The electric energy storage means is continuously charged by the charging means even upon replacement of the fuel supply means. Thus, after the fuel supply means is replaced, the fuel cell can be activated by the output electric energy of the electric energy storage means. It is therefore unnecessary to separately connect another external power supply for activating the fuel cell or provide the legged moving robot with a dedicated power supply for activating the fuel cell.

An arrangement for charging the electric energy storage means according to a third aspect of the present invention has charging means for generating a charging current from output electric energy from the fuel cell and charging the electric energy storage means with the charging current, an external power supply for supplying electric energy, and auxiliary power supply means detachably connected to the external power supply, for activating the fuel cell with the electric energy supplied from the external power supply.

According to the above third aspect, when the auxiliary power supply means is connected to the external power supply, the fuel cell can continuously be activated by the fuel remaining therein when the fuel supply means is replaced. When the fuel remaining in the fuel cell is fully consumed upon replacement of the fuel supply means, the charging means is operated by the electric power supplied from the auxiliary power supply means for thereby continuously charging the electric energy storage means. Therefore, the fuel supply means can be replaced without stopping the operation of the legged moving robot. When the replacement of the fuel supply means is replaced, the fuel cell can be activated again by the electric power supplied from the auxiliary power supply means.

7

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 2(a) through 2(f) are diagrams illustrative of the manner in which the fuel cell operates;

FIGS. 4(a) through 4(f) are diagrams illustrative of the transition of reservoir tank pressures;

FIGS. 5(a) through 5(c) are diagrams illustrative of the transition of a reservoir tank pressure;

DETAILED DESCRIPTION OF THE PREFERRED EMBODIMENTS

A system for controlling the amount of electric energy generated by a fuel cell on a legged moving robot according to a first embodiment of the present invention will be described below with reference to FIGS. 1 through 8.

Figure 1:
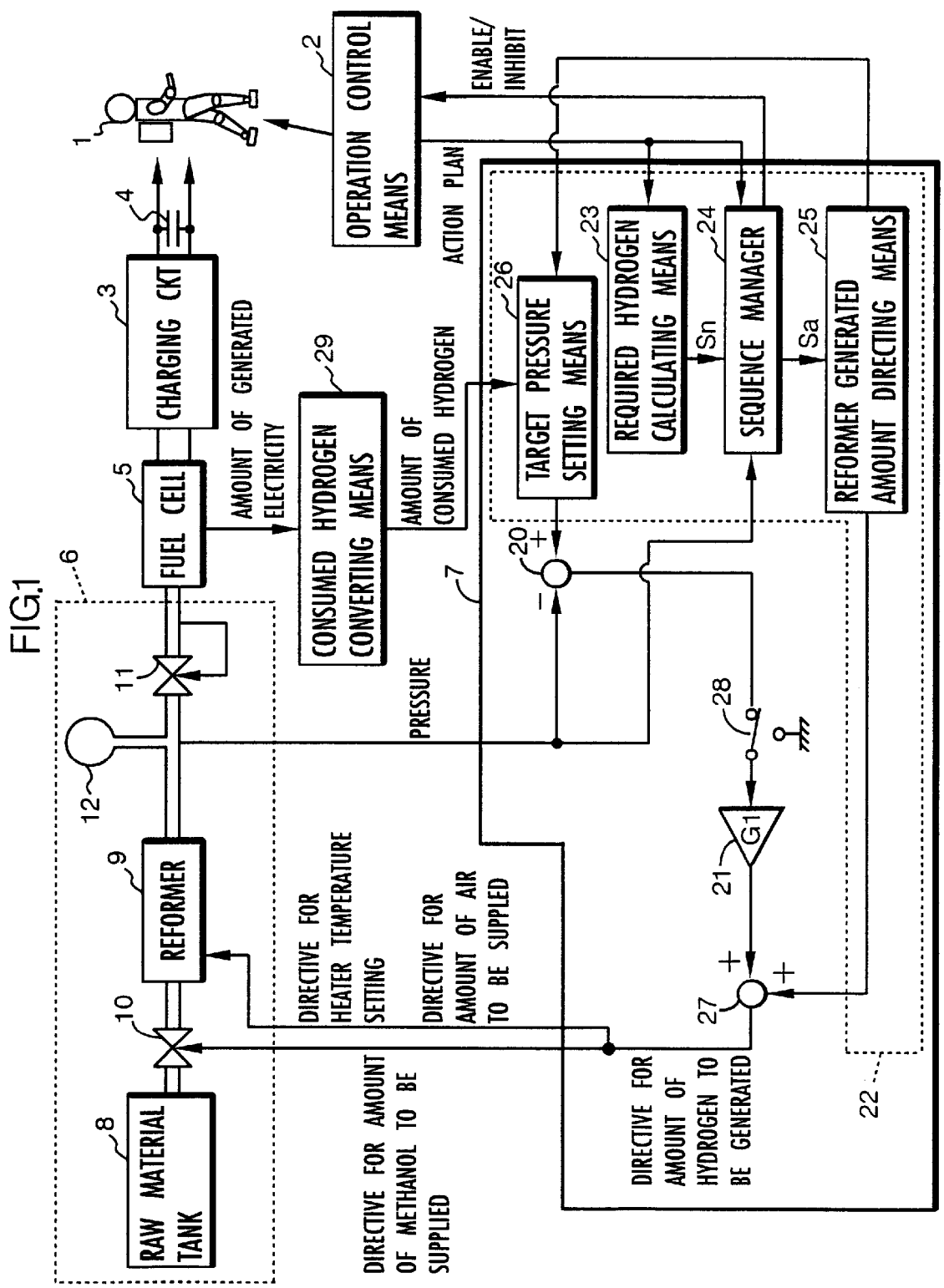
FIG. 1 is a blockdiagram of a system for controlling the amount of electric energy generated by a fuel cell on a legged moving robot according to a first embodiment of the present invention.

As shown in FIG. 1, a legged moving robot 1 comprises a biped robot. The system shown in FIG. 1 has an operation control mans 2 for controlling operation of actuating means such as motors or the like, a fuel cell 5 for supplying operating electric energy to the legged moving robot 1 via a charging circuit 3 (corresponding to a charging means) and an electric double-layer capacitor 4 (corresponding to an electric energy storage means), a hydrogen supply means 6 for supplying hydrogen as a fuel to the fuel cell 5, and an electric generation managing means 7 for regulating the amount of hydrogen supplied from the hydrogen supply means 6 to the fuel cell 5 thereby to control the amount of electric energy generated by the fuel cell 5.

The fuel cell 5 has a negative electrode supplied with hydrogen as a fuel and a positive electrode supplied with air as an oxidizing agent. When thus supplied with hydrogen and air, the fuel cell 5 generates electric energy. specifically, the positive and negative electrodes of the fuel cell 5 under the following chemical reactions:

Negative electrode: $H_2 \rightarrow 2H^+ + 2e^-$ 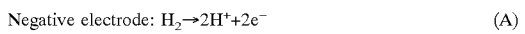 (A)

Positive electrode: $\frac{1}{2}O_2 + 2H^+ + 2e^- \rightarrow H_2O$ 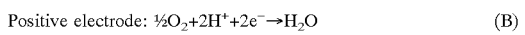 (B)

The generated electric energy is supplied from the fuel cell 5 to the charging circuit 3, which in turn charges the electric double-layer capacitor 4.

The charged electric double-layer capacitor 4 supplies operating electric energy to the legged moving robot 1. Therefore, though the instantaneous maximum output electric energy of the fuel cell 5 is relatively small, the legged moving robot 1 can be supplied with an amount of electric energy which is large enough to meet the power consumption requirement of the legged moving robot 1.

The hydrogen supply means 6 comprises a raw material tank 8 (corresponding to a row material storage means) for storing methanol which is a material of hydrogen, a reformer 9 for decomposing methanol supplied from the raw material tank 8 into hydrogen and carbon dioxide thereby to generate hydrogen as a fuel for the fuel cell 5, a variable valve 10 for regulating the amount of methanol supplied from the raw material tank 8 to the reformer 9, a pressure regulator 11 for reducing the pressure of hydrogen supplied from the reformer 9 to the fuel cell 5 to a constant pressure (e.g., 0.3 atmospheric pressure), and a reservoir tank 12 for storing a sufficient amount of hydrogen to be supplied from the reformer 9 to the fuel cell 5.

A review of the above formula (A) shows that the output electric energy from the fuel cell 5 varies depending on the amount of hydrogen consumed by the fuel cell 5. Therefore, it is necessary to supply the fuel cell 5 with an amount of hydrogen which depends on how the amount of electric energy supplied from the electric double-layer capacitor 4 to the legged moving robot 1 changes, i.e., how the amount of electric energy discharged from the electric double-layer capacitor 4 changes.

If the amount of hydrogen consumed by the fuel cell 5 increases to a value greater than the amount of hydrogen supplied from the reformer 9, then the amount of hydrogen stored in the reservoir tank 12 decreases, and hence the pressure in the reservoir tank 12 also drops. Conversely, if the amount of hydrogen consumed by the fuel cell 5 is smaller than the amount of hydrogen supplied from the reformer 9, then the amount of hydrogen stored in the reservoir tank 12 increases, and hence the pressure in the reservoir tank 12 also rises. Consequently, an excess or shortage of the amount of hydrogen supplied to the fuel cell 5 can be recognized by detecting the pressure in the reservoir tank 12.

The electric generation managing means 7 comprises a required hydrogen calculating means 23 for analyzing an action plan received from the operation control means 2 and calculating an amount of hydrogen to be generated by the reformer 9, which amount is required to perform the action plan (hereinafter referred to as a "required amount of hydrogen to be generated"), a sequence manager 24 for being supplied with the required amount of hydrogen to be generated, the action plan, and a detected pressure of the reservoir tank 12, outputting an ENABLE/INHIBIT signal to the operation control means 2, and determining a time to change the amount of hydrogen to be generated by the reformer 9, a reformer generated amount directing means 25 for directing a change in the amount of hydrogen to be generated to the reformer 9 according to instructions from the sequence manager 24, and a target pressure setting means 26 for establishing a target pressure in the reservoir tank 12 depending on the directed amount of hydrogen to be generated from the reformer generated amount directing means 25 and an amount of hydrogen consumed by the fuel cell 5 as calculated by a consumed hydrogen converting means 29 which converts the amount of hydrogen consumed by the fuel cell 5.

The electric generation managing means 7 serves to effect a control process for maintaining the pressure in the reservoir tank 12 at the target pressure (e.g., 1 atmospheric pressure) established by the target pressure setting means 26. As described later on, the target pressure may not be constant. The electric generation managing means 7 also serves to carry out a feedback control process for regulating the amount of hydrogen generated by the reformer 9 in order to equalize the pressure in the reservoir tank 12 as detected by a pressure sensor (not shown) to the target pressure, for thereby avoiding a shortage of the amount of hydrogen supplied to the fuel cell 5.

More specifically, the electric generation managing means 7 has an adder 20 which subtracts the detected pressure in the reservoir tank 12 from the target pressure, and a calculator 21 which determines a directive for an amount of hydrogen to be generated in order to eliminate the difference calculated by the adder 20. The electric generation managing means 7 also has an adder 27 which adds the directive for an amount of hydrogen to be generated from the calculator 21 and the directed amount of hydrogen to be generated from the reformer generated amount directing means 25, to direct the reformer 9 to adjust the amount of air to be supplied thereto and the temperature setting of a heater thereof, and also direct the variable valve 10 to adjust the amount of methanol to be supplied to the reformer 9.

The operation control means 2 serves to perform an action plan function of the legged moving robot 1. Specifically, when the legged moving robot 1 is to carry out a series of operations, e.g., to walk for a certain distance, the operation control means 2 generates an action plan which defines an operation sequence of actuating means such as motors or the like of the legged moving robot 1 based on the operations, and controls the actuating means according to the action plan.

The electric energy consumed by the biped robot while it is walking may possibly become at least twice the electric energy consumed by the biped robot while it is at rest. When the electric energy consumed by the legged moving robot 1 thus increases, i.e., when the legged moving robot 1 starts walking, the fuel cell 5 needs to sharply increase the amount of electric energy generated thereby. Inasmuch as the reformer 9 generates hydrogen by way of a chemical reaction between methanol and oxygen, a certain time delay occurs before an amount of hydrogen depending on the electric energy required for the legged moving robot 1 to walk is actually generated after the electric generation managing means 7 directs an increase in the amount of hydrogen to be generated by the reformer 9 according to the above feedback control process.

FIGS. 2($a$) and 2($b$) are graphs showing the manner in which such a time delay occurs. In each of the graphs, the vertical axis represents the amount of hydrogen generated by the reformer 9 or the directive for the amount of hydrogen to be generated by the reformer 9, and the horizontal axis represents time. $A_0$ represents the amount of hydrogen to be generated by the reformer 9 (=the directive for the amount of hydrogen to be generated to the reformer 9 and the variable valve 10), which is required when the legged moving robot 1 is at rest, $A_1$ represents the amount of hydrogen to be generated by the reformer 9 (=the directive for the amount of hydrogen to be generated to the reformer 9 and the variable valve 10), which is required when the legged moving robot 1 is walking, i.e., when the legged moving robot 1 is operating under a large load, $t_1$ represents a time at which the legged moving robot 1 starts walking, and $t_2$ represents a time at which the legged moving robot 1 finishes walking.

As shown in FIG. 2($a$), the electric generation managing means 7 increases the directive for the amount of hydrogen to be generated to the reformer 9 and the variable valve 10 from $A_0$ to $A_1$ when the legged moving robot 1 starts walking at the time $t_1$. However, as shown in FIG. 2($b$), there is a time delay Td introduced before the amount of hydrogen generated by the reformer 9 actually reaches $A_1$. During the time delay Td, the operating electric energy supplied to the legged moving robot 1 suffers a shortage when the legged moving robot 1 starts walking, and the operation control means 2 may possibly fail to carry out the action plan properly.

As shown in FIG. 1, before the legged moving robot 1 starts walking, the electric generation managing means 7 carries out an anticipatory process for directing the reformer 9 and the variable valve 10 to increase the amount of generated hydrogen. The electric generation managing means 7 includes a feed-forward control process section which corresponds to the anticipatory process. Specifically, the electric generation managing means 7 analyzes the contents of the action plan generated by the operation control means 2 and monitors whether the legged moving robot 1 will operate under a large load which requires electric energy to be supplied from the fuel cell 5 at a predetermined level or higher.

If the electric generation managing means 7 recognizes that the legged moving robot 1 will operate under a large load, then the electric generation managing means 7 sends an INHIBIT signal to the operation control means 2 to inhibit the operation control means 2 from operating the legged moving robot 1 under the large load. Then, the required hydrogen calculating means 23 calculates an amount Sn of hydrogen to be generated depending on the electric energy required to operate the legged moving robot 1 under the large load (which amount corresponds to a required amount to be supplied. In FIGS. 2($a$) through 2($f$), the amount $A_1$ corresponds to the amount Sn) from a data table which has experimentally been determined or a predetermined equation.

The sequence manager 24 calculates a preparation time Ts, compares the preparation time Ts with the present time, and indicates a subsequent operation sequence to the operation control means 2 and the reformer generated amount directing means 25. In response to the indicated subsequent operation sequence, the reformer generated amount directing means 25 calculates a directive for equalizing the amount of hydrogen to be generated by the reformer 9 to $A_1$. The directive is added to the output from the calculator 21 by the adder 27, which then supplies an incremental directive to the reformer 9 and the variable valve 10 to equalize the amount of hydrogen to be generated by the reformer 9 to $A_1$. At this time, a switch 28 may be operated to interrupt the feedback control process carried out by the adder 20 and the calculator 21 for thereby preventing the incremental directive for the amount of hydrogen to be generated, which is supplied to the reformer 9 and the variable valve 10, from being limited by the feedback control process.

The target pressure setting means 26 may output an estimated value of a pressure transition at the time hydrogen is generated using only the output of the reformer generated amount directing means 25 directly as a directive for the amount of hydrogen to be generated, for thereby equivalently canceling the feedback control process carried out by the adder 20 and the calculator 21, i.e., for thereby substantially eliminating the output of the calculator 21, thus preventing the incremental directive supplied to the reformer 9 and the variable valve 10 from being limited by the feedback control process.

Figure 3:
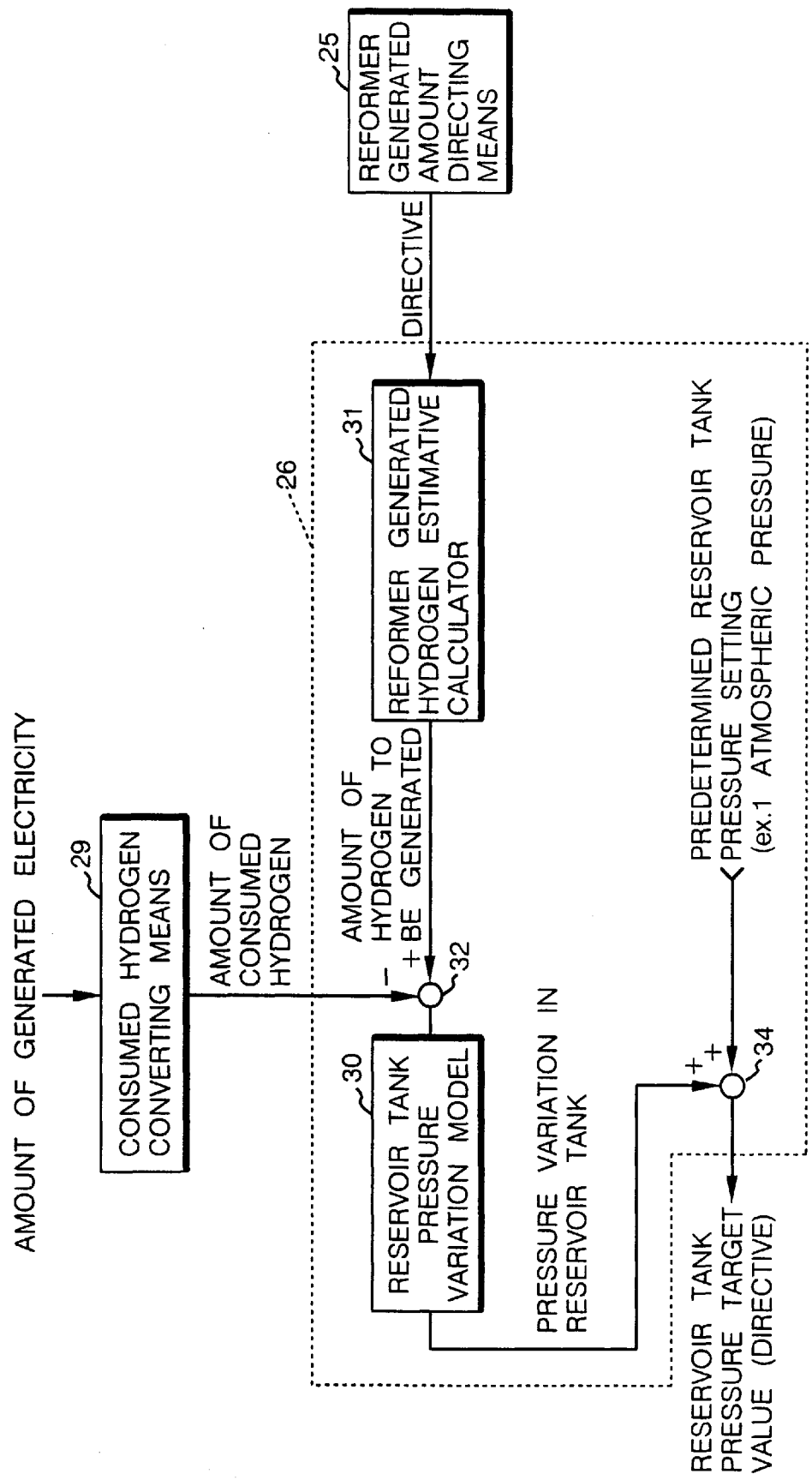
FIG. 3 is a block diagram of a target pressure setting means in the system shown in FIG. 1.

FIG. 3 shows the target pressure setting means 26 in detail. As shown in FIG. 3, the target pressure setting means 26 is supplied with the directive from the reformer generated amount directing means 25 and the amount of consumed hydrogen calculated by the consumed hydrogen converting means 29, and outputs the sum of a pressure variation estimated by a reservoir tank model 30 and a predetermined reservoir tank pressure setting of about 1 atmospheric pressure as the target pressure in the reservoir tank 12. The reservoir tank model 30 may be the same as the one used in an observer (described later on) shown in FIG. 10. The output from the reformer generated amount directing means 25 to the adder 27 may be converted so as to be equivalent to the above pressure variation.

Operation of the target pressure setting means 26 will be described in detail with reference to FIG. 3. In the target pressure setting means 26, a reformer generated hydrogen estimative calculator 31 calculates a time-series amount of hydrogen to be generated from the time-series directive for an amount of hydrogen to be generated which is received from the reformer generated amount directing means 25. Then, an adder 32 subtracts a real-time value of the amount of hydrogen consumed by the fuel cell 5, which is calculated by the consumed hydrogen converting means 29, from the calculated time-series amount of hydrogen to be generated. The reservoir tank model 30 then estimates a pressure variation in the reservoir tank 12 from the difference calculated by the adder 32.

In this manner, the pressure variation in the reservoir tank 12 which results from the feed-forward control process carried out by the reformer generated amount directing means 25 can be added to a reservoir tank pressure target value (directive). When the feedback control process is carried out on the basis of the reservoir tank pressure target value, the feed-forward control process is prevented from being affected by the feedback control process.

When the preparation time Ts has elapsed after sending the incremental directive to the reformer 9 and the variable valve 10, the electric generation managing means 7 sends a walking permission signal (ENABLE signal) to the operation control means 2, which signal corresponds to a directive to start operating the legged moving robot 1 under the large load. In FIG. 2(c), a region represents an excessive amount of generated hydrogen, and a region ≠, which is of the same area as the region , consumes the excessive amount of generated hydrogen. Thus, the legged moving robot 1 can start walking after the preparation time Ts. In FIG. 2(c), h(t) represents an actual amount of hydrogen generated by the reformer 9, and g(t) represents an actual amount of hydrogen consumed by the fuel cell 5. Because the incremental directive is applied to the reformer 9 and the variable valve 10 to increase the amount of generated hydrogen before the legged moving robot 1 starts walking, as described above, any changes in the pressure in the reservoir tank 12 are reduced as shown in FIG. 2(d). Therefore, the reservoir tank 12 may be reduced in size.

Inasmuch it is difficult to accurately determine the actual delay time Td in FIG. 2(b), the preparation time Ts is calculated depending on reaction delay characteristics of the reformer 9, where the reformer 9 is grasped as an element with a time lag of first order having a time constant τ (τ is experimentally determined in advance), according to this embodiment. A process of calculating the preparation time Ts will be described below with reference to the graph shown in FIG. 2(c). For illustrative purposes, it is assumed that the amount $A_0$ of hydrogen to be generated when the legged moving robot 1 is at rest is "0", and a time $t_0$ at which an incremental directive is issued to equalize the amount of hydrogen to be generated to $A_1$ is "0". It is also assumed that the amount of hydrogen generated by the reformer 9 increases and decreases in the same manner.

The graph shown in FIG. 2(c) shows a superposition of the following functions g(t), h(t):

$$g(t) = \begin{cases} A_1 (t_1 \leq t \leq t_2) \\ 0 \ (t < t_1, t_2 < t) \end{cases} \quad (1)$$

$$h(t) = A_1\left(1 - e^{-\frac{t}{\tau}}\right)(t_1 \leq t) \quad (2)$$

The function g(t) represents a transition of an ideal amount of hydrogen to be generated by the reformer 9 when the legged moving robot 1 moves from the time $t_1$ to the time $t_2$ under a large load, and the function h(t) represents a transition of an amount of hydrogen to be generated by the reformer 9 which is assumed to be an element with a time lag of first order, when a directive to equalize the amount of supplied hydrogen to $A_1$ from the time $t_0$ that is earlier than the time $t_1$ by the predicted time delay Ts to a time $t_w (t_w - t_0 = t_2 - t_1 =$ walking time). The areas of the regions , ≠ are expressed respectively by:

$$\text{``} = \int_0^{t_1} A_1\left(1 - e^{-\frac{t}{\tau}}\right) dt \quad (3)$$

$$\neq = \int_{t_1}^{t_w} \left\{A_1 - A\left(1 - e^{-\frac{t}{\tau}}\right)\right\} dt = \int_{t_1}^{t_w} A_1 e^{-\frac{t}{\tau}} dt \quad (4)$$

Because of a balance to be achieved between the amount of hydrogen generated by the reformer 9 and the amount of hydrogen consumed by the fuel cell 5, the above equations (3), (4) are equalized to each other (=≠) and solved for $t_1$ as follows:

$$t_1 = \tau - e^{\frac{t_w}{\tau}} \quad (5)$$

Since it can be assumed that $t_w >> \tau$, $t_1$ is expressed by:

$$t_1 \approx \tau \quad (6)$$

The electric generation managing means 7 uses the time constant τ as the preparation time Ts. Specifically, at the time $t_1$ upon elapse of the preparation time Ts after sending the incremental directive at the time to as shown in FIG. 2(e), the electric generation managing means 7 sends the ENABLE signal to the operation control means 2. At this time, the amount of hydrogen generated by the reformer 9, which is assumed to be an element with a time lag of first order, changes as indicated by the dotted-line curve in FIG. 2(e). The amount of hydrogen generated at the time $t_1$ is represented by $A_0+(A_1-A_0)\times 63.2\%$ (corresponding to a target amount of hydrogen to be generated). As a result, the region in FIG. 2(c) represents an excessive amount of generated hydrogen, and the region ≠, which is of the same area as the region , consumes the excessive amount of generated hydrogen, with the result that the walking of the legged moving robot 1 is not obstructed.

At the time $t_w$ which is the preparation time Ts earlier than the walking finishing time $t_2$, the electric generation managing means 7 reduces the directive for the amount of hydrogen to be generated from $A_1$ to $A_0$. As shown in FIG. 2(d), therefore, the pressure in the reservoir tank 12 is prevented from being increased excessively after the legged moving robot 1 has stopped walking.

When the reaction delay of the reformer 9 according to the reaction delay characteristics thereof is large, the electric generation managing means 7 gives an incremental directive to increase the amount of hydrogen to be generated to $A_2$ higher than $A_1$, as shown in FIG. 2(f), for thereby shortening the time required for the amount of hydrogen to be generated by the reformer 9 to increase to the target amount Sa of hydrogen to be generated.

A process of reducing a pressure change in the reservoir tank 12 when the electric generation managing means 7 calculates the preparation time Ts and controls the amount of hydrogen to be generated by the reformer 9 will be described below with reference to FIGS. 4(a) through 4(f) and 5(a) through 5(c). FIGS. 4(a), 4(b), and 4(c) illustrate a pressure change in the reservoir tank 12 at the time the legged moving robot 1 is controlled to walk according to a conventional process, and FIGS. 4(d), 4(e), and 4(f) illustrate a pressure change in the reservoir tank 12 at the time the legged moving robot 1 is controlled to walk with the preparation time Ts being equal to the time constant τ. FIGS. 5(a), 5(b), and 5(c) illustrate a pressure change in the reservoir tank 12 at the time the legged moving robot 1 is controlled to walk with the preparation time Ts being shorter than the time constant τ.

According to the conventional process, the time $t_0$ at which the amount of generated hydrogen as shown in FIG. 4(a) and the time $t_1$ at which the legged moving robot 1 starts walking as shown in FIG. 4(b) are the same as each other. As a result, for a certain period of time after the legged moving robot 1 has started walking, the amount of hydrogen consumed by the fuel cell 5 as shown in FIG. 4(b) is greater than the actual amount of hydrogen generated by the reformer 9 as shown in FIG. 4(a), and the pressure in the reservoir tank 12 largely drops to a level lower than a minimum pressure required to operate the legged moving robot 1 as shown in FIG. 4(c). In this case, the amount of hydrogen supplied to the fuel cell 5 is reduced, resulting in a shortage of the amount of electric energy generated by the fuel cell 5.

When the legged moving robot 1 stops walking, since the actual amount of hydrogen generated by the reformer 9 as shown in FIG. 4(a) becomes greater than the amount of hydrogen consumed by the fuel cell 5 as shown in FIG. 4(b), and the pressure in the reservoir tank 12 exceeds a limit maximum pressure determined according to specifications of the reservoir tank 12 as shown in FIG. 4(c). If the volume of the reservoir tank 12 is increased to avoid these drawbacks, then the reservoir tank 12 will increase in size and weight.

According to a process of the present invention, after an incremental directive is given to increase the amount of hydrogen to be generated at the time to in FIG. 4(d), the legged moving robot 1 is controlled to start walking at the time $t_1$ after elapse of the preparation time Ts as shown in FIG. 4(e). The preparation time Ts is set to the time constant τ at the time the reformer 9 is regarded as an element with a time lag of first order. Since the time at which the legged moving robot 1 starts walking is thus delayed, as shown in FIG. 4(f), the pressure change in the reservoir tank 12 is made smaller than the pressure change according to the conventional process as shown in FIG. 4(c). Consequently, the reservoir tank 12 can be reduced in size and weight.

According to another process of the present invention, the preparation time Ts shown in FIG. 5(g) is set to a period shorter than the time constant τ as shown in FIG. 5(h). As a result, as shown in FIG. 5(i), the pressure change in the reservoir tank 12 is made smaller than the pressure change achieved by the process according to the present invention as shown in FIG. 4(f). Therefore, the reservoir tank 12 can further be reduced in size and weight. The preparation time Ts is expressed by:

Ts=time constant (τ)×constant (equal to or smaller than 1), and is applied both when the legged moving robot 1 starts walking and when the legged moving robot 1 stops walking. If required, the preparation time Ts can be set to more finely adjusted values, and may be calculated by:

Ts=f (a present pressure, a change in the target amount of hydrogen to be generated, a target pressure setting, an upper pressure limit, a lower pressure limit, a time constant), so that the pressure in the reservoir tank 12 will not exceed the upper pressure limit (corresponding to a predetermined upper pressure limit). The present pressure means the present pressure in the reservoir tank 12, and the target pressure setting means a target value for the pressure in the reservoir tank 12, which is an input variable. The other values in the above equation represent parameters. The time constant means a time constant at the time the reformer 9 is regarded as an element with a time lag of first order. For example, if the present pressure is high, since the amount of hydrogen stored in the reservoir tank 12 is sufficient, the preparation time Ts may be set to a shorter value. Rather than calculating the preparation time Ts according to the above equations, the preparation time Ts may be determined from an experimentally prepared data table or the like.

Figure 7:
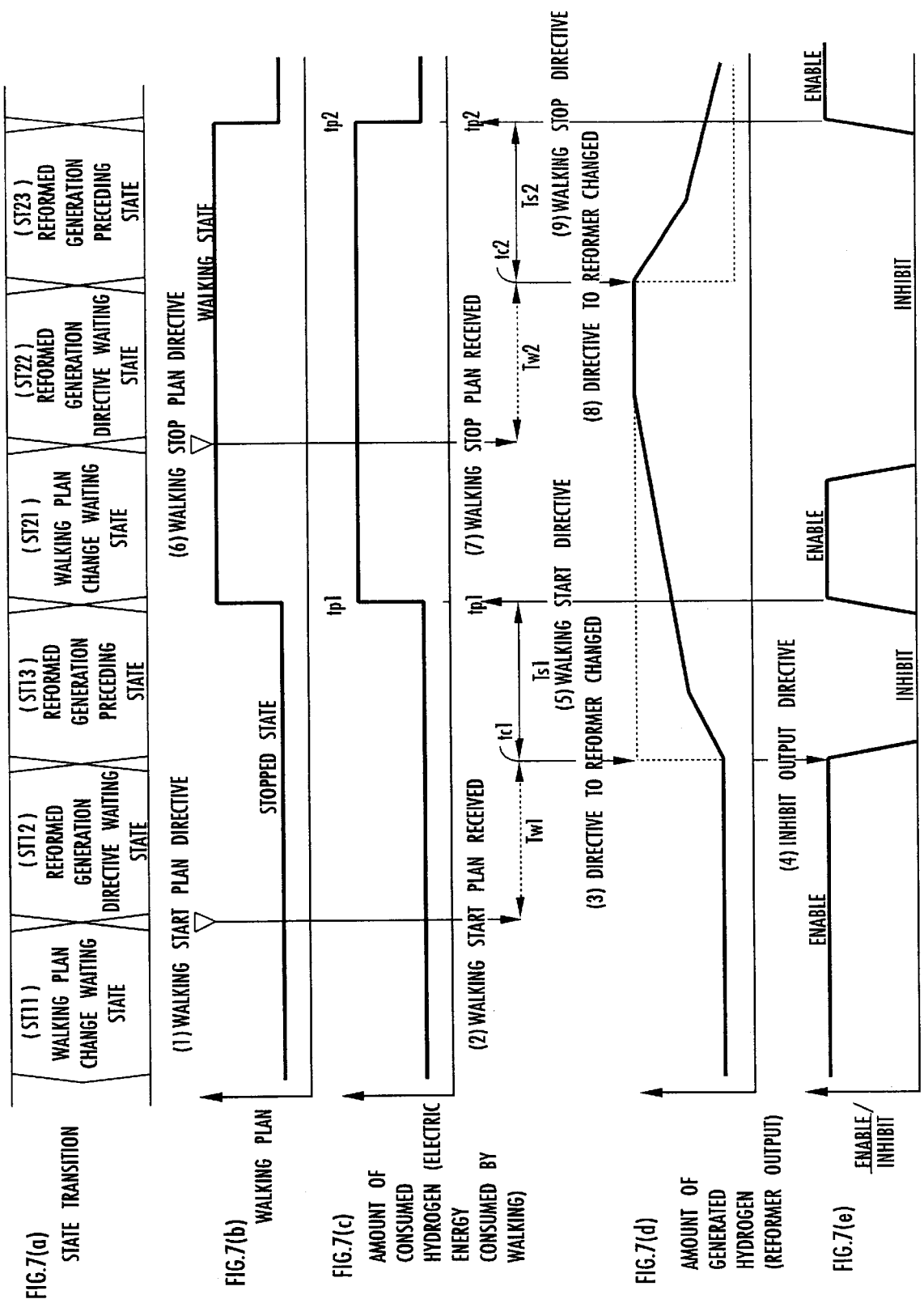
FIGS. 7(a) through 7(e) are timing charts of an operation sequence of an electric generation managing means in the system shown in FIG. 1.
Figure 8:
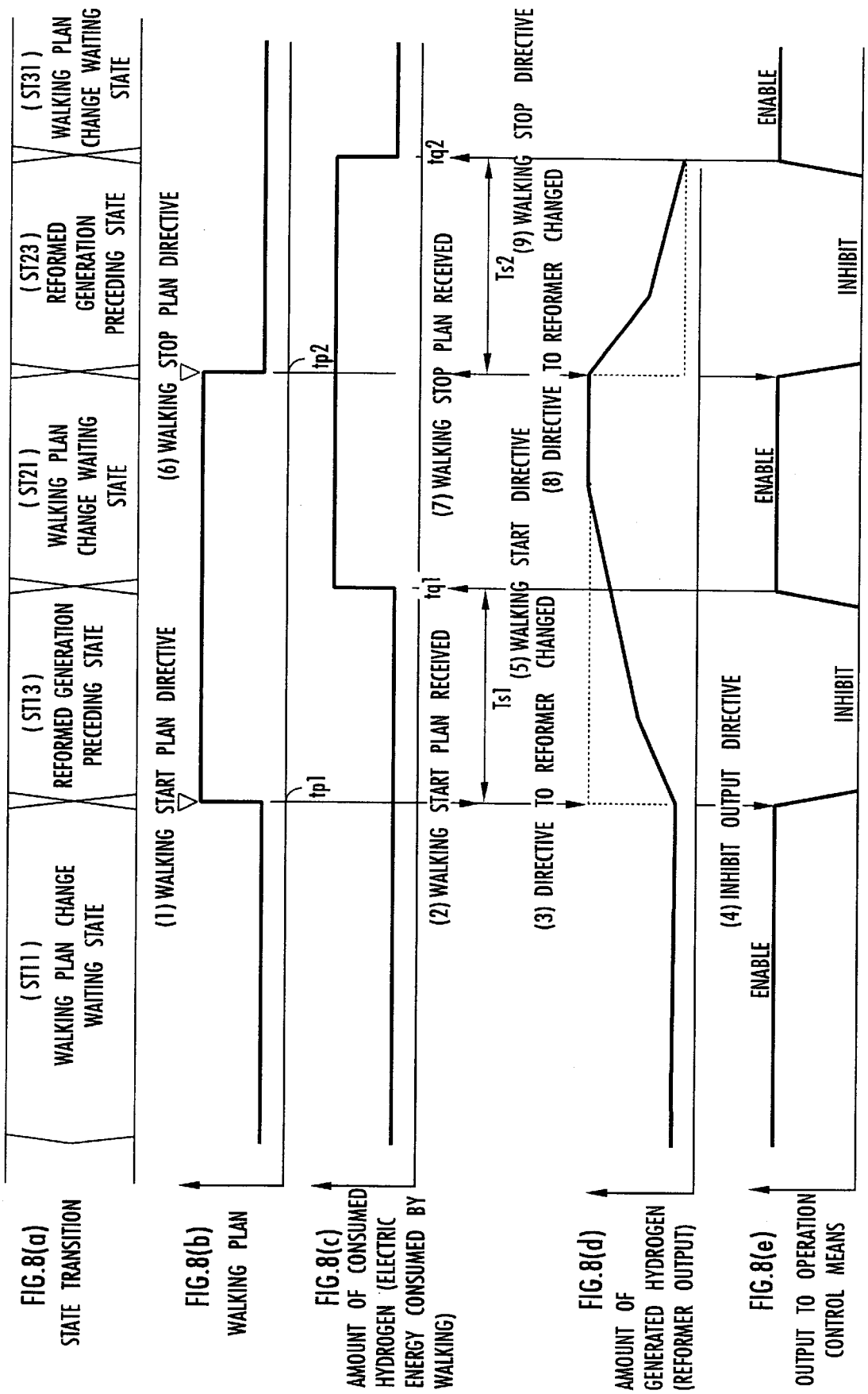
FIGS. 8(a) through 8(e) are timing charts of another operation sequence of the electric generation managing means in the system shown in FIG. 1.

Specific operation of the electric generation managing means 7 in the system for controlling the amount of electric energy generated by the fuel cell on the legged moving robot according to the first embodiment of the present invention will be described below basically in relation to operation of the sequence manager 24 with reference to FIGS. 1, 6, 7, and 8. FIGS. 7(a) and 8(a) show a transition of the operation state of the sequence manager 24. FIGS. 7(b) and 8(b) show an action plan (walking plan) directed by the operation control means 2. FIGS. 7(c) and 8(c) show a transition of the amount of hydrogen consumed by the fuel cell 5 (corresponding to the amount of electric energy consumed by the legged moving robot 1). FIGS. 7(d) and 8(d) show a transition of the amount of hydrogen generated by the reformer 9. FIGS. 7(e) and 8(e) show changes in a control signal (ENABLE/INHIBIT) outputted to the operation control means 2.

Figure 6:
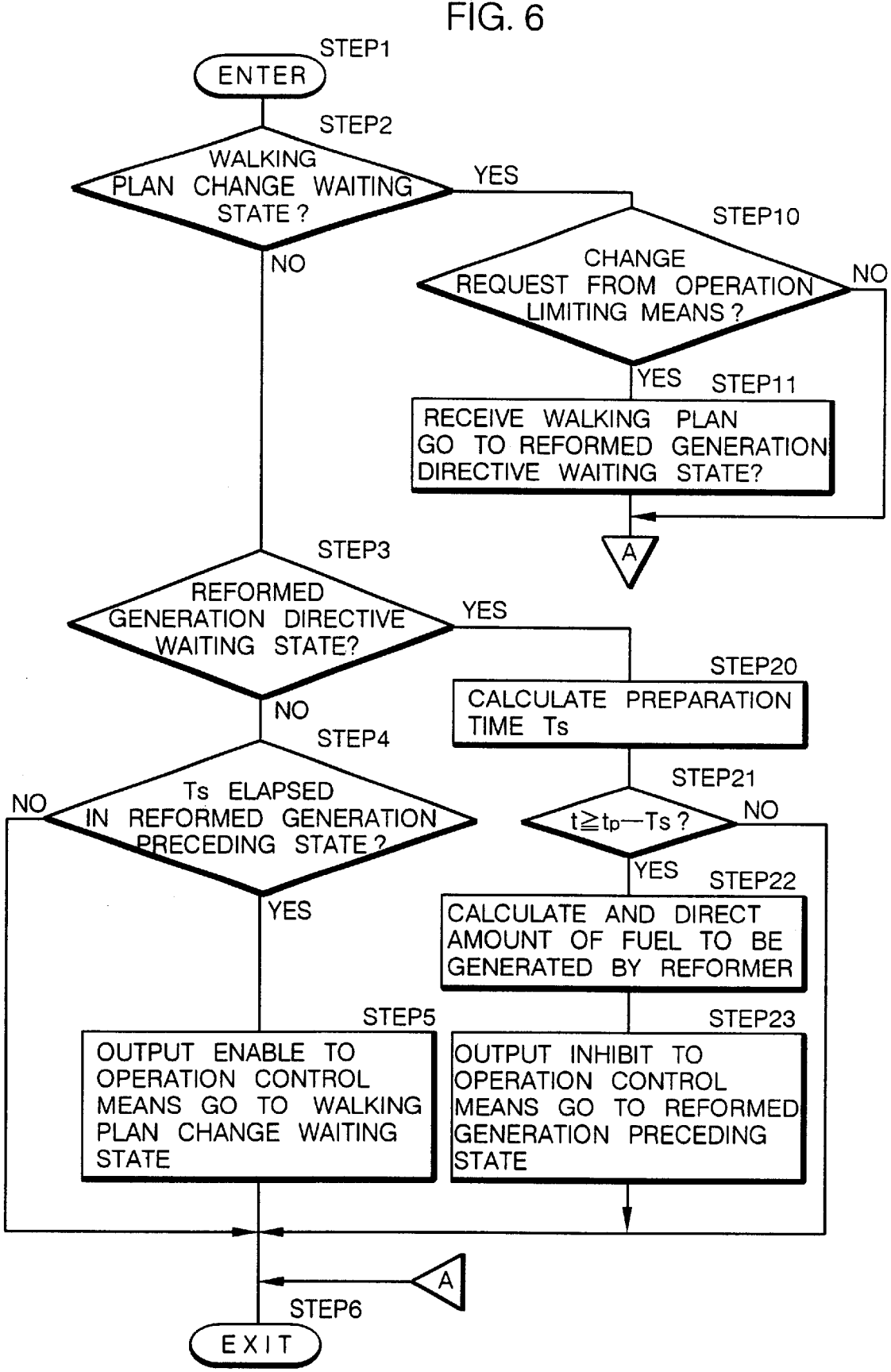
FIG. 6 is a flowchart of an operation sequence of a sequence manager in the system shown in FIG. 1.

The sequence manager 24 repeatedly executes a routine of STEPs 1 through 6 in the flowchart shown in FIG. 6. In the routine of STEPs 1 through 6, the operation state of the sequencemanager 24 is either one of "WALKING PLAN CHANGE WAITING STATE" which is a state of waiting for a walking plan directive from the operation control means 2, "REFORMED GENERATION DIRECTIVE WAITING STATE" which is a state of waiting for the timing to direct a change in the amount of generated hydrogen from the reformer generated amount directing means 25 to the reformer 9 after a walking plan directive is received from the operation control means 2, and "REFORMED GENERATION PRECEDING STATE" which is a state of waiting for the preparation time Ts to elapse after the reformer 9 is directed to change the amount of generated.

When in "WALKING PLAN CHANGE WAITING STATE", the sequence manager 24 branches from STEP 2 to STEP 10. If there is a request for a walking plan change from the operation control means 2 in STEP 10, then control goes to STEP 11 in which the sequence manager 24 receives contents (directives for the start of walking and the stop of walking) of the walking plan from the operation control means 2, and goes to "REFORMED GENERATION DIRECTIVE WAITING STATE". If there is no request for a walking plan change from the operation control means 2 in STEP 10, then the sequence manager 24 remains in "WALKING PLAN CHANGE WAITING STATE".

When in "REFORMED GENERATION DIRECTIVE WAITING STATE", the sequence manager 24 branches from STEP 3 to STEP 20 in which it calculates the preparation time Ts. If the present time t is the preparation time Ts earlier than a directed time $t_p$ for starting the walking plane ($t \geq t_p - Ts$), then control goes to STEP 22 in which the reformer generated amount directing means 25 calculates an amount of hydrogen to be generated by the reformer 9 and indicates the calculated amount to the reformer 9. In STEP 23, the sequence manager 24 outputs an INHIBIT signal to the operation control means 2 to inhibit an operation change of the operation control means 2, and goes to "REFORMED GENERATION PRECEDING STATE".

When in "REFORMED GENERATION PRECEDING STATE", upon elapse of the preparation time Ts after going to "REFORMED GENERATION PRECEDING STATE" in STEP 4, the sequence manager 24 sends an ENABLE signal to the operation control means 2 in STEP 5. In response to the ENABLE signal, the operation control means 2 executes the requested walking plan. Then, the sequence manager 24 goes to "WALKING PLAN CHANGE WAITING STATE".

The ENABLE signal is a signal for permitting the operation control means 2 to change operation of the legged moving robot 1, but not a signal for permitting the walking of the legged moving robot 1. Specifically, when the ENABLE signal is sent from the sequence manager 24 to the operation control means 2, a change of operation of the legged moving robot 1 is permitted, and the operation control means 2 can stop the legged moving robot 1 which has been walking. When no ENABLE signal is outputted from the sequence manager 24 to the operation control means 2, no change of operation of the legged moving robot 1 is permitted, and the legged moving robot 1 continuously walks if it has been walking, for example.

A specific example of operation of the legged moving robot 1 according to the flowchart shown in FIG. 6 will be described below with reference to FIGS. 7(a) through 7(e).

FIGS. 7(a) through 7(e) illustrate an example in which there is a latency time after the sequence manager 24 has received the walking plan from the operation control means 2 until the legged moving robot 1 actually starts walking. When the sequence manager 24 is in "WALKING PLAN CHANGE WAITING STATE" (ST11 in FIG. 7(a)), if the sequence manager 24 receives awaking plan directive (in FIG. 7(b)) for the legged moving robot 1 to start walking at a time $t_p1$ from the operation control means 2 ($\neq$ in FIG. 7(c)), then the sequence manager 24 enters and remains in "REFORMED GENERATION DIRECTIVE WAITING STATE" (ST12 in FIG. 7(a)) during a period (Tw1) until a time $t_c1$ which is a preparation time Ts1 earlier than the walking start time $t_p1$.

At the time $t_c1$, the sequence manager 24 causes the reformer generated amount directing means 25 to increase the directive for the amount of hydrogen to be generated by the reformer 9 (· in FIG. 7(d)). As shown in FIG. 7(d), the amount of hydrogen generated by the reformer 9 increases. The sequence manager 24 sends an INHIBIT signal to the operation control means 2 to inhibit the operation control means 2 from operating, and goes to "REFORMED GENERATION PRECEDING STATE" (ST13 in FIG. 7(a)).

At the walking start time $t_p1$, the sequence manager 24 outputs an ENABLE signal to the operation control means 2 to cancel the operation inhibition for thereby issuing a walking start directive (f in FIG. 7(d)). The operation control means 2 now controls the legged moving robot 1 to start walking, and the sequence manager 24 goes to "WALKING PLAN CHANGE WAITING STATE" (ST21 in FIG. 7(a)).

When the sequence manager 24 receives an action plan directive ($\approx$ in FIG. 7(b)) to stop walking from the operation control means 2 ($\Delta$ in FIG. 7(c)), the sequence manager 24 enters and remains in "REFORMED GENERATION DIRECTIVE WAITING STATE" (ST22 in FIG. 7(a)) during a period (Tw1) until a time $t_c2$ which is a preparation time Ts2 earlier than a walking stop time $t_p2$.

At the time $t_c2$, the sequence manager 24 causes the reformer generated amount directing means 25 to reduce the directive for the amount of hydrogen to be generated by the reformer 9 ($\geq$ in FIG. 7(d)), and goes to "REFORMED GENERATION PRECEDING STATE" (ST23 in FIG. 7(a)). As shown in FIG. 7(d), the amount of hydrogen generated by the reformer 9 gradually decreases. The sequence manager 24 outputs an ENABLE signal to the operation control means 2 at the walking stop time $t_p2$ thereby to issue a walking stop directive (¥ in FIG. 7(d)). In response to the walking stop directive, the operation control means 2 controls the legged moving robot 1 to stop walking.

In this manner, the delay time represented by the preparation time Ts2 is included after the operation control means 2 receives the walking stop directive from the sequence manager 24 until the legged moving robot 1 actually stops walking. Therefore, when the legged moving robot 1 stops walking, the amount of hydrogen supplied from the reformer 9 to the fuel cell 5 is prevented from becoming excessive, and hence the pressure in the reservoir tank 12 is prevented from suffering an abnormal buildup.

FIGS. 8(a) through 8(e) illustrate an example in which the legged moving robot 1 starts walking simultaneously when or in a short period of time after the sequence manager 24 receives the walking plan from the operation control means 2. When the sequence manager 24 is in "WALKING PLAN CHANGE WAITING STATE" (ST11 in FIG. 8(a)), if the sequence manager 24 receives an action plan directive (in FIG. 8(b)) for the legged moving robot 1 to start walking immediately from the operation control means 2 (≠ in FIG. 8(c)), then the sequence manager 24 causes the reformer generated amount directing means 25 to increase the directive for the amount of hydrogen to be generated by the reformer 9 (· in FIG. 8(d)). The sequence manager 24 sends an INHIBIT signal to the operation control means 2 to inhibit the operation control means 2 from operating, and goes to "REFORMED GENERATION PRECEDING STATE" (ST13 in FIG. 8(a)). At this time, the sequence manager 24 does not go to "REFORMED GENERATION DIRECTIVE WAITING STATE" (ST12 in FIG. 7(a)).

As shown in FIG. 8(d), the amount of hydrogen generated by the reformer 9 gradually increases. The sequence manager 24 outputs an ENABLE signal to the operation control means 2 thereby to issue a walking stop directive (f in FIG. 8(d)) at a time $t_q1$ upon elapse of a preparation time Ts1 after going to "REFORMED GENERATION PRECEDING STATE". In this manner, the delay time represented by the preparation time Ts1 is included after the operation control means 2 receives the walking stop directive from the sequence manager 24 until the legged moving robot 1 actually stops walking. Therefore, when the legged moving robot 1 starts walking, the amount of hydrogen supplied from the reformer 9 to the fuel cell 5 is prevented from becoming short, and hence the amount of electric energy generated by the fuel cell 5 is prevented from suffering a shortage.

When the sequence manager 24 receives an action plan directive (≈ in FIG. 8(b)) to stop walking from the operation control means 2 (Δ in FIG. 8(c)), the sequence manager 24 immediately causes the reformer generated amount directing means 25 to reduce the directive for the amount of hydrogen to be generated by the reformer 9 (≧ in FIG. 8(d)), and goes to "REFORMED GENERATION PRECEDING STATE" (ST23 in FIG. 8(a)). Therefore, as when the legged moving robot 1 starts moving, the sequence manager 24 does not go to "REFORMED GENERATION DIRECTIVE WAITING STATE".

As shown in FIG. 8(d), the amount of hydrogen generated by the reformer 9 gradually decreases. The sequence manager 24 outputs an ENABLE signal to the operation control means 2 at a time $t_q2$ upon elapse of the preparation time Ts2 after going to "REFORMED GENERATION PRECEDING STATE" (ST23 in FIG. 8(a)) thereby to issue a walking stop directive (¥ in FIG. 8(d)). As with the example shown in FIGS. 7(a) through 7(e), therefore, when the legged moving robot 1 stops walking, the amount of hydrogen supplied from the reformer 9 to the fuel cell 5 is prevented from becoming excessive, and hence the pressure in the reservoir tank 12 is prevented from suffering an abnormal buildup.

A system for controlling the amount of electric energy generated by a fuel cell on a legged moving robot according to a second embodiment of the present invention will be described below with reference to FIGS. 9 and 10. Those parts of the system shown in FIGS. 9 and 10 which are identical to those shown in FIG. 1 are denoted by identical reference numerals, and will not be described in detail below. According to the first embodiment, the timing to send an ENABLE signal to the operation control means 2 as a walking start directive is determined by the preparation time Ts. However, since the preparation time Ts is calculated regarding the reformer 9 as an element with a time lag of first order, the preparation time Ts may possibly suffer a large error with respect to the actual delay time of the reformer 9.

Figure 9:
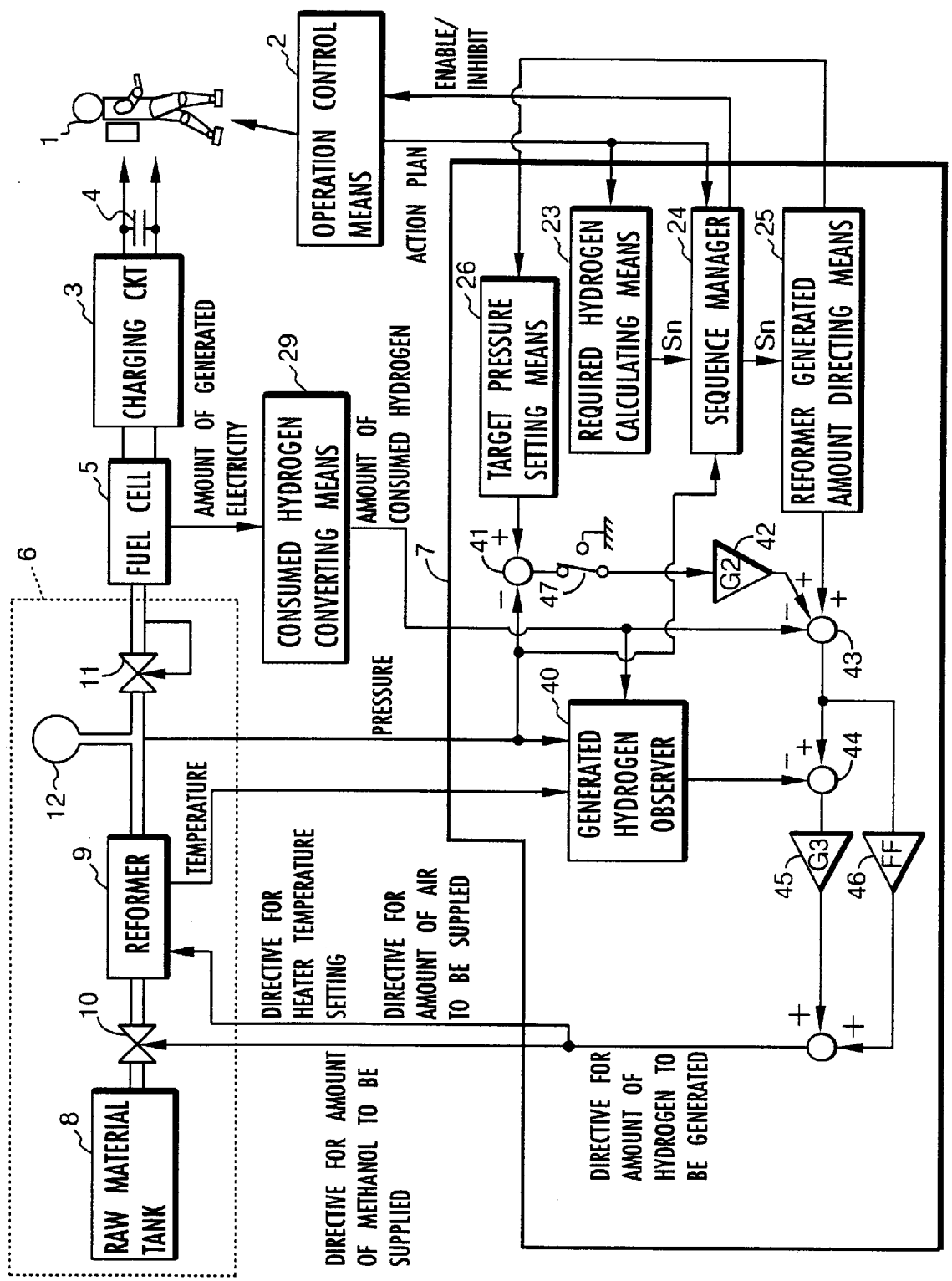
FIG. 9 is a block diagram of a system for controlling the amount of electric energy generated by a fuel cell on a legged moving robot according to a second embodiment of the present invention.

As shown in FIG. 9, the electric generationmanaging means 7 in the system according to the second embodiment has an observer 40 (corresponding to a generated fuel amount grasping means) for grasping an amount of hydrogen generated by the reformer 9. As shown in FIG. 10, the observer 40 is supplied with an amount of hydrogen consumed by the fuel cell 5 as calculated by the consumed hydrogen converting means 29 from the amount of electric energy generated by the fuel cell 5, a temperature in the reformer 9 as detected by a temperature sensor 101, and a pressure in the reservoir tank 12 as detected by a pressure sensor 102, and estimates an amount of hydrogen generated by the reformer 9.

As shown in FIG. 9, the consumed hydrogen converting means 29 divides the amount of electric energy generated by the fuel cell 5 by a consumed hydrogen amount conversion ratio to calculate an amount of hydrogen consumed by the fuel cell 5. As shown in FIG. 10, the observer 40 has an adder 108 which is supplied with the difference between the amount of hydrogen consumed by the fuel cell 5 as calculated by the consumed hydrogen converting means 29, and a preceding value of the amount of generated hydrogen estimated by the observer 40, a calculating element 104 which determines a pressure in the reservoir tank 12 depending on the volume of the reservoir tank 12, a correcting element 105 which corrects the pressure in the reservoir tank 12 depending on the temperature, and an adder 106 which determines the difference between the corrected pressure and the pressure in the reservoir tank 12 as detected by the pressure sensor 42. The difference is supplied to a transfer function H, whose output signal is used as an estimated present amount of hydrogen generated by the reformer 9.

The transfer function H may be selected from a plurality of transfer functions depending on whether more importance is to be attached to response or estimating accuracy. The consumed hydrogen amount conversion ratio may be regarded as 1/(the electric energy generation efficiency of the fuel cell).

As shown in FIG. 9, the electric generationmanaging means 7 has an adder 41 which determines the difference between the detected pressure in the reservoir tank 12 and the target pressure of about 1 atmospheric pressure which is established by the target pressure setting means 26, and a calculator 42 which determines a directive in order to eliminate the difference calculated by the adder 41. The electric generation managing means 7 also has an adder 43 which adds the directive from the calculator 42 and the directed amount of hydrogen to be generated from the reformer generated amount directing means 25, and subtracts the amount of hydrogen consumed by the fuel cell 5 as calculated by the consumed hydrogen converting means 29.

The electric generation managing means 7 also has an adder 44 which subtracts the amount of hydrogen generated by the reformer 9 as estimated by the observer 40 from the directive from the adder 43, and a calculator 45 which directs an amount of hydrogen to be generated to the reformer 9 and the variable valve 10 in order to equalize the amount of hydrogen generated by the reformer 9 as estimated by the observer 40 to the directive from the adder 43. The electric generation managing means 7 may have a feed-forward element 46 for improving the response speed.

The electric generation managing means 7 also has a switch 47, which is similar to the switch 28 shown in FIG. 1, that is operated to interrupt the feedback control process carried out by the adder 41 for thereby preventing the incremental directive for the amount of hydrogen to be generated, which is supplied to the reformer 9 and the variable valve 10, from being limited by the feedback control process.

As described above, the observer 40 estimates an amount of hydrogen generated by the reformer 9, and determines the difference between the estimated amount and the directive for an amount of hydrogen to be generated. When the increment of the actual amount of hydrogen generated by the reformer 9 in response to the incremental directive for increasing the amount of generated hydrogen is small, the incremental directive is further increased. The observer 40 in the system according to the second embodiment shown in FIG. 9 provides a local feedback loop on the directive for an amount of hydrogen to be generated, which is outputted from the reformer generated amount directing means 25, unlike the system according to the first embodiment which does not employ the observer. Therefore, the system according to the second embodiment is more responsive and can control the amount of generated hydrogen more accurately than the system according to the first embodiment. Consequently, the actual amount of generated hydrogen upon elapse of the preparation time Ts is close to the estimated value more accurately, with the result that the possibility of a shortage of the electric energy supplied to the legged moving robot 1 is reduced.

Figure 11:
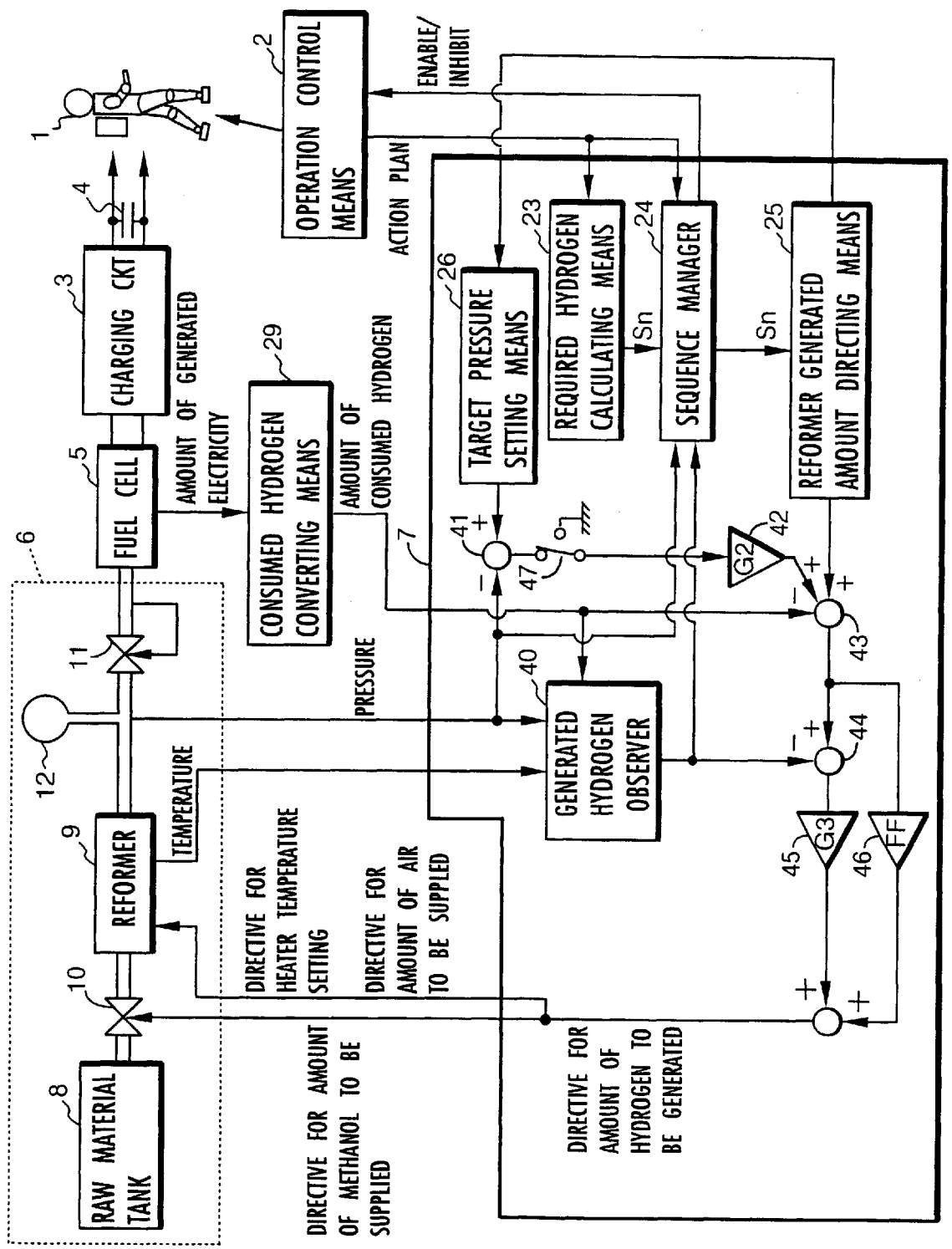
FIG. 11 is a block diagram of a system for controlling the amount of electric energy generated by a fuel cell on a legged moving robot according to a third embodiment of the present invention.

A system for controlling the amount of electric energy generated by a fuel cell on a legged moving robot according to a third embodiment of the present invention will be described below with reference to FIG. 11. Those parts of the system shown in FIG. 11 which are identical to those shown in FIG. 1 are denoted by identical reference numerals, and will not be described in detail below. According to the second embodiment, the timing to send an ENABLE signal to the operation control means 2 as a walking start directive is determined on the basis of the preparation time Ts. According to the third embodiment, a decision reference amount Sa of hydrogen to be generated is determined depending on the required amount Sn of hydrogen to be generated, and the timing to send an ENABLE signal to the operation control means 2 is determined on the basis of the decision reference amount Sa.

Specifically, in the electric generation managing means 7, the required hydrogen calculating means 23 calculates the required amount Sn of hydrogen to be generated. The electric generation managing means 7 determines the decision reference amount Sa to be 70% of the required amount Sn, for example. The reformer generated amount directing means 25 issues an incremental directive to increase the amount of generated hydrogen to the reformer 9 in order to generate hydrogen in the decision reference amount Sa. The control process subsequent to the adder 43 is the same as the control process according to the second embodiment.

The sequence manager 24 compares the decision reference amount Sa with an amount Sp of hydrogen generated by the reformer 9 as estimated by the observer 40, and outputs an ENABLE signal to the operation control means 2 when the amount Sp is equal to or greater than the decision reference amount Sa. As with the first and second embodiments, therefore, the amount of hydrogen generated by the reformer 9 can be increased to a level required for the legged moving robot 1 to walk until the legged moving robot 1 starts walking (at the time $t_1$). When the legged moving robot 1 starts walking, the amount of electric energy supplied from the fuel cell 5 is prevented from suffering a shortage. The decision reference amount Sa may be varied depending on the remaining pressure in the reservoir tank 12.

While the preparation time Ts is used as a reference to decide whether an ENABLE signal is to be outputted or not in the first and second embodiments, the estimated value of the amount of generated hydrogen is used as such a reference according to the third embodiment. According to the third embodiment, therefore, it is possible to decide more accurately whether an ENABLE signal is to be outputted or not, and as a result, the possibility of a shortage of the electric energy supplied to the legged moving robot 1 is greatly reduced.

Figure 10:
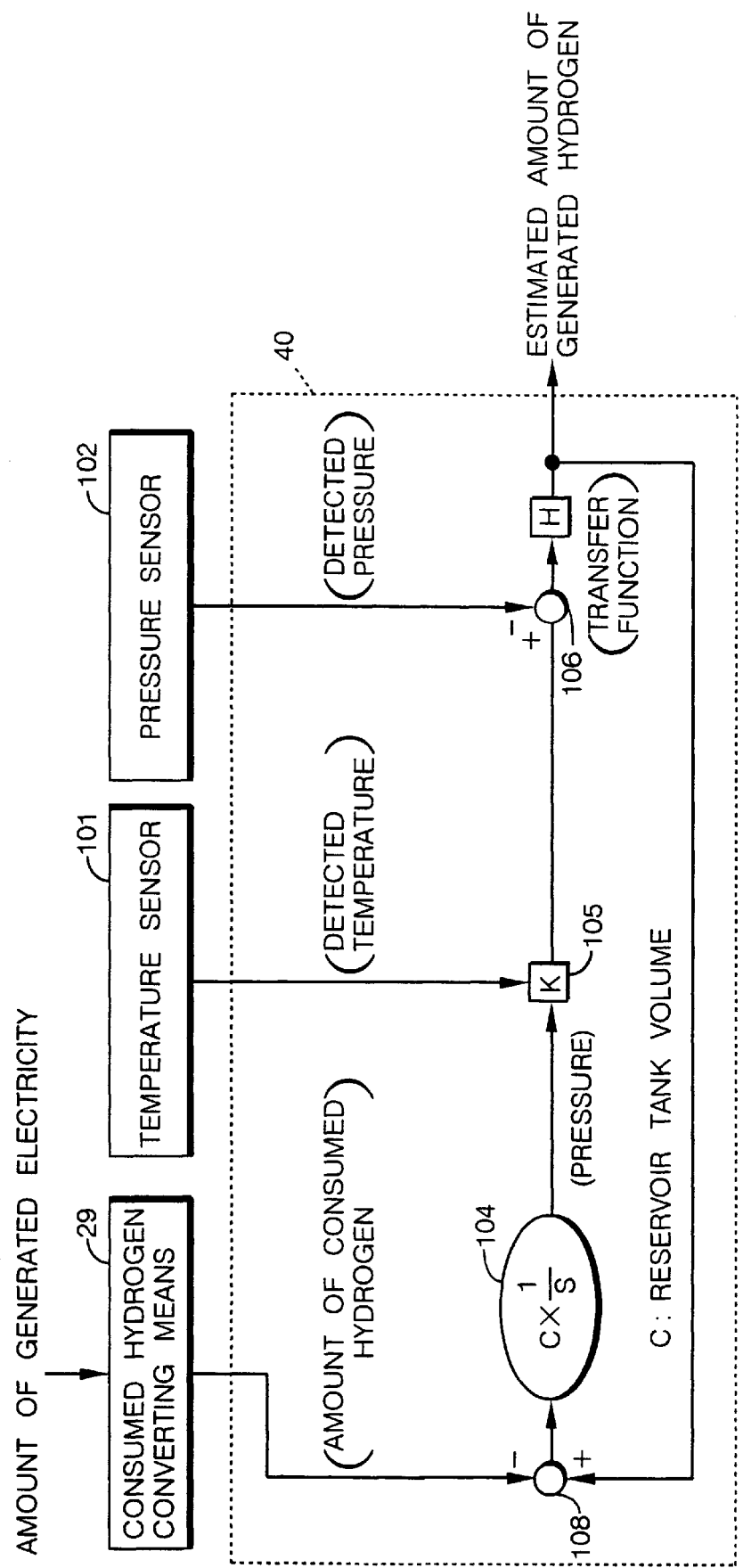
FIG. 10 is a block diagram of an observer in the system shown in FIG. 9.

In FIG. 10, if the observer 40 fails to function normally due to a fault of the temperature sensor 101 or the like, then even when the electric generation managing means 7 has issued an incremental directive to increase the amount of generated hydrogen to the reformer 9 and the variable valve 10, and the amount of hydrogen generated by the reformer 9 has actually increased to the decision reference amount Sa, the amount of hydrogen generated by the reformer 9 as estimated by the observer 40 may not increase to or beyond the decision reference amount Sa. If this happens, since no ENABLE signal is sent to the operation control means 2, the legged moving robot 1 fails to operate.

Such an operation failure of the legged moving robot 1 may be avoided by the following process: When the sequence manager 24 issues an incremental directive, the sequence manager 24 calculates the preparation time Ts as with the first and second embodiments. When the preparation time Ts has elapsed after the incremental directive has been issued, it is estimated that the amount of hydrogen generated by the reformer 9 is equal to or greater than the decision reference amount Sa.

Therefore, when the preparation time Ts has elapsed after the incremental directive has been issued to the reformer 9 and the variable valve 10, the sequence manager 24 sends an ENABLE signal to the operation control means 2 even if the amount of hydrogen generated by the reformer 9 as estimated by the observer 40 has not reached the decision reference amount Sa. In this fashion, the legged moving robot 1 is prevented from failing to operate.

In each of the first, second, and third embodiments, the electric double-layer capacitor is used as the electric energy storage means. However, a capacitor other than the electric double-layer capacitor or a secondary battery such as a lithium-ion battery or the like may be used as the electric energy storage means.

In each of the first, second, and third embodiments, the operating electric energy is supplied from the electric double-layer capacitor 4 to the legged moving robot 1. However, if electric energy consumption by the legged moving robot 1 is so small that the legged moving robot 1 can be operated with the electric energy supplied from the fuel cell 5, then the electric double-layer capacitor 4 and the charging circuit 3 may be dispensed with, and the fuel cell 5 may directly supply the operating electric energy to the legged moving robot 1.

In each of the first, second, and third embodiments, the reformer 9 uses methanol as a raw material from which to generate hydrogen. However, another type of reformer may be employed.

A control system for charging the electric double-layer capacitor 4 with the electric energy outputted from the fuel cell 5 in FIG. 1 will be described below with reference to FIGS. 12, 13, and 14(*a*)–14(*c*). Those parts of the control system which are identical to those shown in FIG. 1 are denoted by identical reference numerals, and will not be described in detail below.

Figure 12:
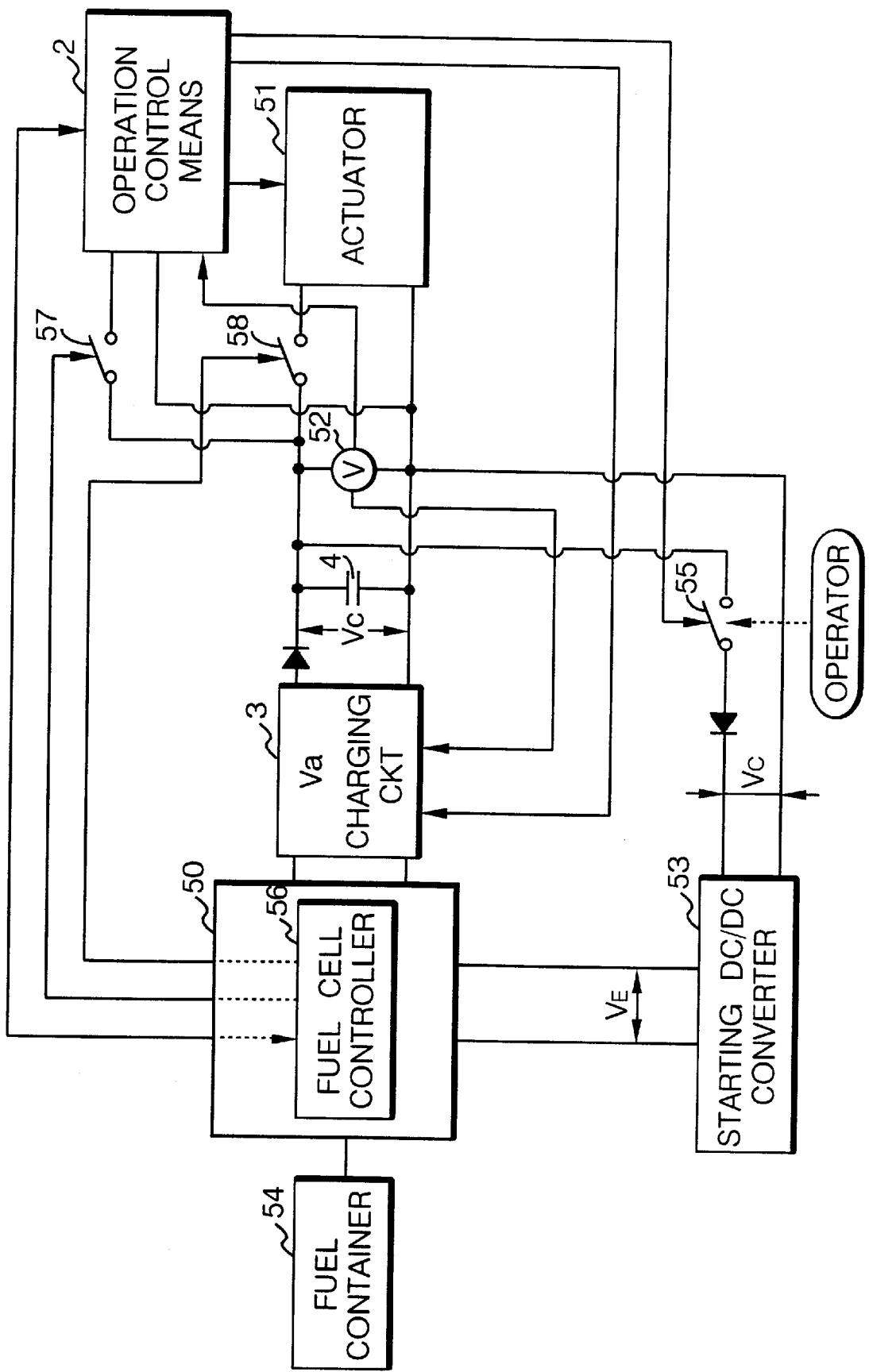
FIG. 12 is a block diagram of a control system for charging an electric double-layer capacitor.

As shown in FIG. 12, a fuel cell unit 50 which includes the fuel cell 5 outputs electric energy to charge the electric double-layer capacitor 4 via the charging circuit 3 (corresponding to a charging control means). The electric double-layer capacitor 4 outputs electric energy to operate an actuator 51 such as a motor or the like. A voltage sensor 52 detects an output voltage of the electric double-layer capacitor 4.

The charging circuit 3 controls the magnitude of a charging current supplied to the electric double-layer capacitor 4 so that the output voltage Vc of the electric double-layer capacitor 4 as detected by the voltage sensor 52 will be equalized to a predetermined charging reference voltage Va of 136 V, for example.

A DC/DC converter 53 (corresponding to a fuel cell starting means) reduces the output voltage Vc of the electric double-layer capacitor 4 to an operating voltage $V_E$ of 18 V, for example, for the fuel cell unit 50. In the system shown in FIG. 1, the reformer 9 generates hydrogen, which is a fuel for the fuel cell, from methanol. In the control system shown in FIG. 12, hydrogen is supplied from a fuel container 54 directly to the fuel cell unit 50.

Operation of the control system shown in FIG. 12 will be described below. The legged moving robot 1 starts operating when a main switch 55 is closed. When the main switch 55 is turned on, the electric double-layer capacitor 4 supplies electric energy to the DC/DC converter 53 to start operating the fuel cell unit 50. When the output of the fuel cell unit 50 increases to about 20%, for example, of its maximum rate, a fuel cell controller 56 in the fuel cell unit 50 closes a first auxiliary switch 57 to operate the operation control means 2. When the output of the fuel cell unit 50 increases to about 60%, for example, of its maximum rate, the fuel cell controller 56 closes a second auxiliary switch 58 to start supplying electric energy to the actuator 51.

The operation control means 2 controls operation of the actuator 51 to control the legged moving robot 1 to walk or otherwise operate. The operation control means 2 and the fuel cell controller 56 are interconnected for communication with each other. The fuel cell controller 56 sends an operation status signal or the like of the fuel cell unit 50 to the operation control means 2. The operation control means 2 sends an operation control signal or the like for the fuel cell unit 50 to the fuel cell controller 56.

Figure 13:
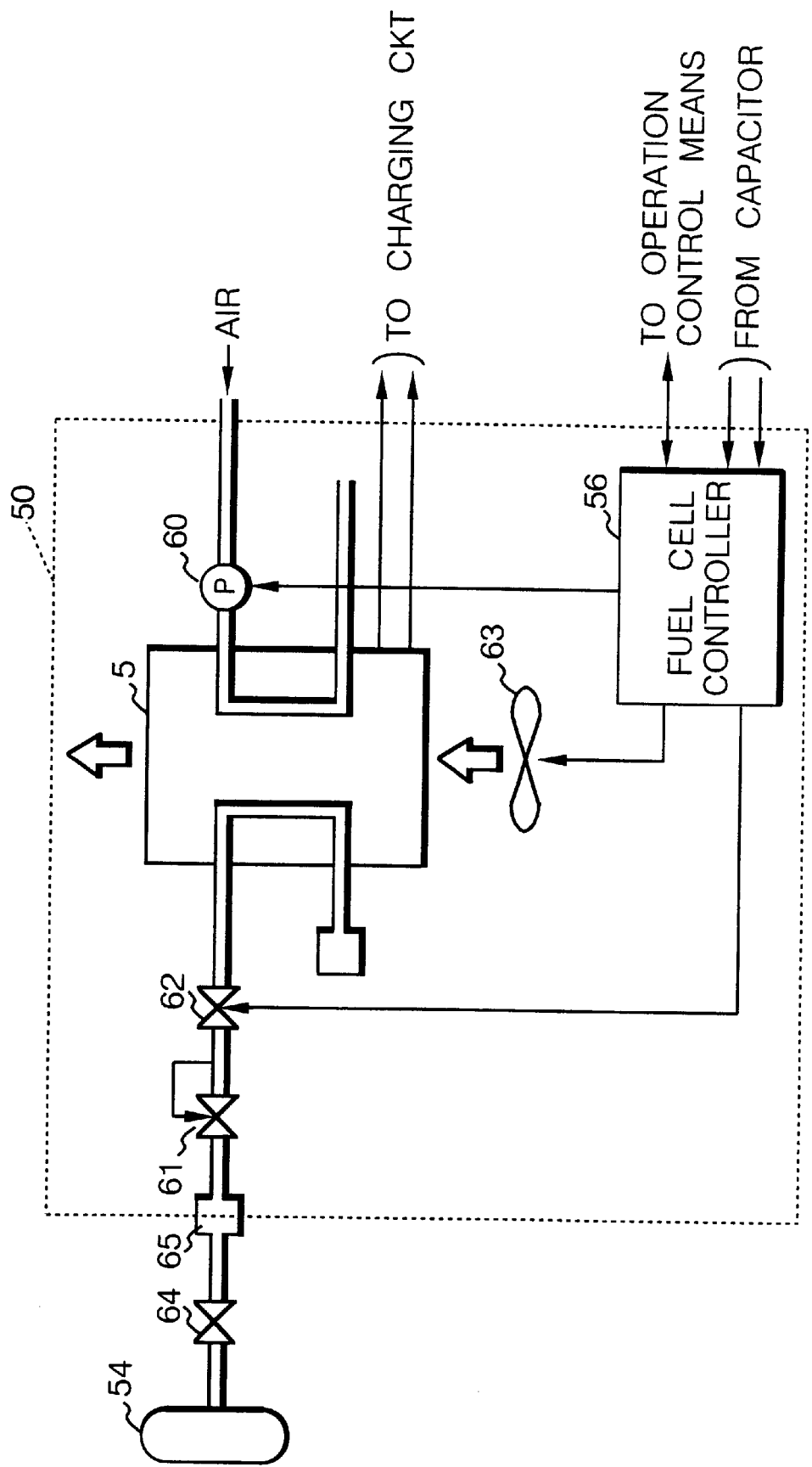
FIG. 13 is a block diagram of a fuel cell unit in the control system shown in FIG. 12.

As shown in FIG. 13, the fuel cell unit 50 comprises the fuel cell 5 for generating electric energy by way of a chemical reaction between hydrogen and oxygen in air, a compressor 60 controlled in operation by a control signal from the fuel cell controller 56 to supply air to the fuel cell 5, a constant-pressure regulator 61 for maintaining a constant pressure at which hydrogen is supplied to the fuel cell 5, a first shutoff valve 62 which can be opened and closed by a control signal from the fuel cell controller 56, and a cooling fan 63 controlled in operation by a control signal from the fuel cell controller 56 to dissipate the heat generated by the fuel cell 5 due to the chemical reaction. The first shutoff valve 62 may be replaced with a proportional control valve.

A second shutoff valve 64 is a manual shutoff valve which is used for the replacement of the fuel container 54. When the first shutoff valve 62 is closed, the operator manually closes the second shutoff valve 64 and detaches a connector 65 for thereby easily removing the fuel container 54, which has been used up, from the fuel cell unit 50.

The fuel cell controller 56 serves to control operation of the fuel cell unit 60. When the fuel cell controller 56 starts to operate with electric energy supplied from the electric double-layer capacitor 4 via the DC/DC converter 53, the fuel cell controller 56 starts the compressor 60 to supply air to the fuel cell 5, and opens the first shutoff valve 62 to supply hydrogen to the fuel cell 5. The fuel cell5 now begins the chemical reaction.

In order to start the chemical reaction in the fuel cell 5 to start the fuel cell 5, it is necessary to keep a constant level of voltage (hereinafter referred to as a "minimum starting voltage Vmin") supplied from the electric double-layer capacitor 4 to the DC/DC converter 53 such that the DC/DC converter 53 can supply such a level of electric energy which can normally operate the fuel cell controller 56, the compressor 60, and the first shutoff valve 62.

The fuel cell 5 stops operating when an operation stop signal is sent from the operation control means 2 to the fuel cell controller 56, as shown in FIG. 12. In response to the operation stop signal from the operation control means 2, as shown in FIG. 13, the fuel cell controller 56 stops operating the compressor 60 and closes the first shutoff valve 62 to stop operating the fuel cell 5. When the output of the fuel cell 5 drops to a predetermined level, the fuel cell controller 56 sends a fuel cell stop signal representing that the fuel cell 5 is inactivated to the operation control means 2.

In response to the fuel cell stop signal, the operation control means 2 opens the main switch 55. The output voltage supplied from the electric double-layer capacitor 4 to the DC/DC converter 53 is now shut off, and the electric energy supplied from the DC/DC converter 53 to the fuel cell unit 50 is also shut off. Therefore, the fuel cell controller 56 stops operating. In response to the operation stop of the fuel cell controller 56, the first auxiliary switch 57 and the second auxiliary switch 58 are opened, shutting off the supply of electric energy to the operation control means 2 and the actuator 51, so that the legged moving robot 1 is inactivated in its entirety.

As shown in FIG. 12, the output voltage of the electric double-layer capacitor 4 is basically maintained as the charging reference voltage Va of 136 V by the charging circuit 3. When the legged moving robot 1 operates in a manner to consume a large amount of electric energy, as when the legged moving robot 1 walks at a fast pace, the current supplied from the electric double-layer capacitor 4 to the actuator 51 may be greater than the current supplied from the charging circuit 3 to the electric double-layer capacitor 4.

Figure 14A:
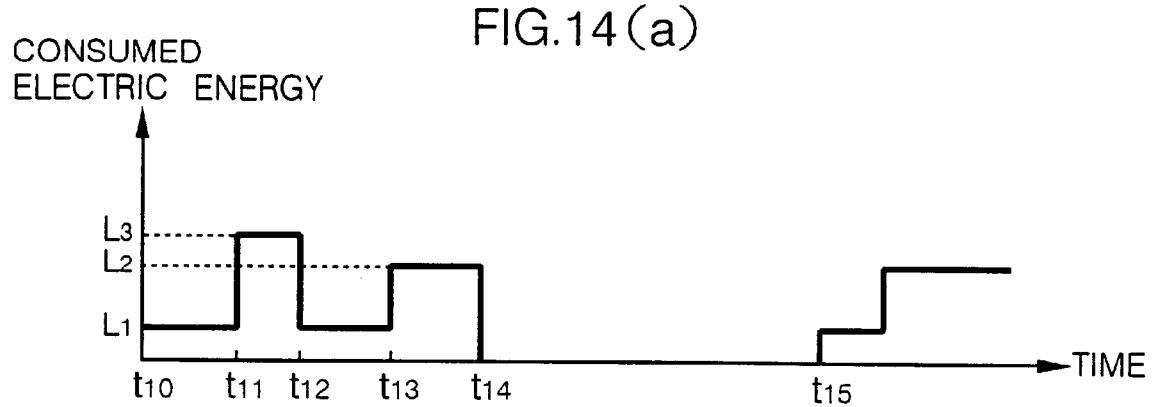
FIG. 14(a) is a diagram showing the transition of electric energy consumed by a legged moving robot.
Figure 14B:
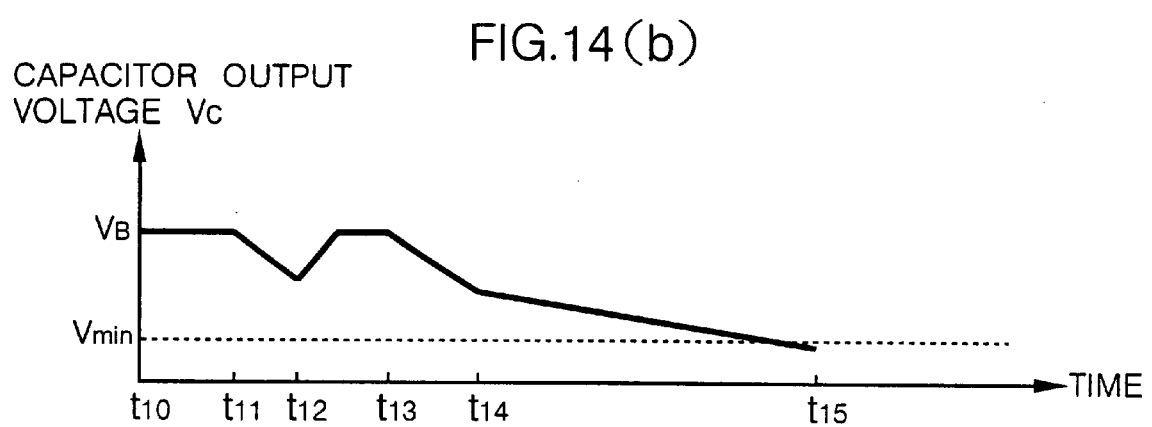
FIG. 14(b) is a diagram showing the transition of an output voltage of a capacitor according to a conventional arrangement.
Figure 14C:
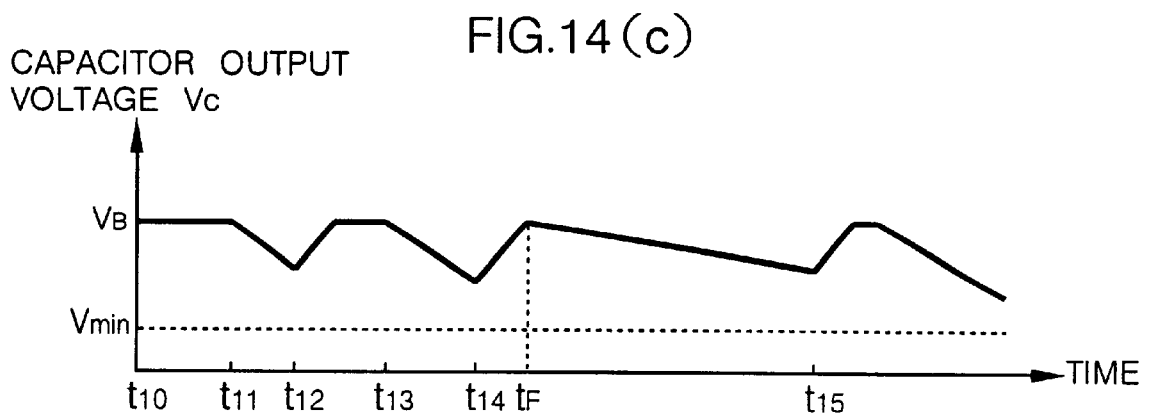
FIG. 14(c) is a diagram showing the transition of an output voltage of a capacitor according to the present invention.

In such a case, since the electric energy stored in the electric double-layer capacitor 4 is discharged to the actuator 51, the output voltage of the electric double-layer capacitor 4 drops. FIGS. 14(a)–14(c) show the manner in which the output voltage of the electric double-layer capacitor 4 changes. In FIGS. 14(a) and 14(b), between a time $t_{10}$ and a time $t_{11}$, the electric energy consumed by the legged moving robot 1 is of a low level $L_1$, and the output voltage Vc of the electric double-layer capacitor 4 is maintained as the charging reference voltage Va. When the consumed electric energy increases from the level $L_1$ to a level $L_3$ at the time $t_{11}$, the electric energy stored in the electric double-layer capacitor 4 is discharged, resulting in a drop in the output voltage Vc of the electric double-layer capacitor 4.

When the operation of the legged moving robot 1 with the consumed electric energy at the level $L_3$ is finished at a time $t_{12}$, the electric double-layer capacitor 4 starts being charged again until the output voltage thereof reaches the charging reference voltage Va. Subsequently, since the legged moving robot 1 operates with electric energy consumed at a level $L_2$ between a time $t_{13}$ and a time $t_{14}$, the output voltage Vc of the electric double-layer capacitor 4 falls. When the legged moving robot 1 stops operating and the fuel cell unit 50 also stops operating at a time $t_{14}$, because the charging circuit 3 stops charging the electric double-layer capacitor 4, the output voltage Vc of the electric double-layer capacitor 4 gradually falls subsequently.

When the operator closes the main switch 55 at a time $t_{15}$ in FIG. 14(b) in an attempt to start operating the legged moving robot 1, since the output voltage Vc of the electric double-layer capacitor 4 has been lower than the minimum starting voltage Vmin, the fuel cell unit 50 cannot be started.

To avoid such a shortcoming, the operation control means 2 carries out a control process as shown in FIG. 14(c). When the legged moving robot 1 stops operating at the time $t_14$, the operation control means 2 does not immediately send the fuel cell stop signal to the fuel cell controller 56. Instead, the operation control means 2 sends the fuel cell stop signal after the output voltage Vc of the electric double-layer capacitor 4 has been increased up to the charging reference voltage Va (corresponding to a reference voltage) by the charging circuit 3 at a time $t_F$.

Even if the supply of the fuel to the fuel cell 5 is stopped, the electric double-layer capacitor 4 can be charged by the output electric energy from the fuel cell 5 until any remaining fuel in the fuel cell 5 is fully consumed. Therefore, the operation control means 2 may send the fuel cell stop signal shortly before the output voltage Vc of the electric double-layer capacitor 4 reaches the charging reference voltage Va.

As described above, since the fuel cell unit 50 is directed to be de-energized after the output voltage Vc of the electric double-layer capacitor 4 has recovered the charging reference voltage Va, the output voltage Vc of the electric double-layer capacitor 4 can be equal to or higher than the minimum starting voltage Vmin at the time $t_{15}$. Therefore, it is possible to prevent the fuel cell unit 50 from failing to start again due to a shortage of the output voltage Vc of the electric double-layer capacitor 4.

In FIGS. 12, 13, and 14(a)–14(c), the electric double-layer capacitor is used as the electric energy storage means. However, another type of capacitor may be used as the electric energy storage means.

If a capacitor having a high natural discharging rate is used as the electric energy storage means, then it is particularly effective in offering the advantages of the present invention. However, the advantages of the present invention can also be achieved if a secondary battery such as a nickel-cadmium battery, a lithium-ion battery, or the like is used as the electric energy storage means.

In FIGS. 12, 13, and 14(a)–14(c), the reference voltage according to the present invention is set to the charging reference voltage Va. However, the reference voltage according to the present invention may be higher than the charging reference voltage Va insofar as the reference voltage does not exceed the maximum rate of the electric double-layer capacitor 4.

Figure 15:
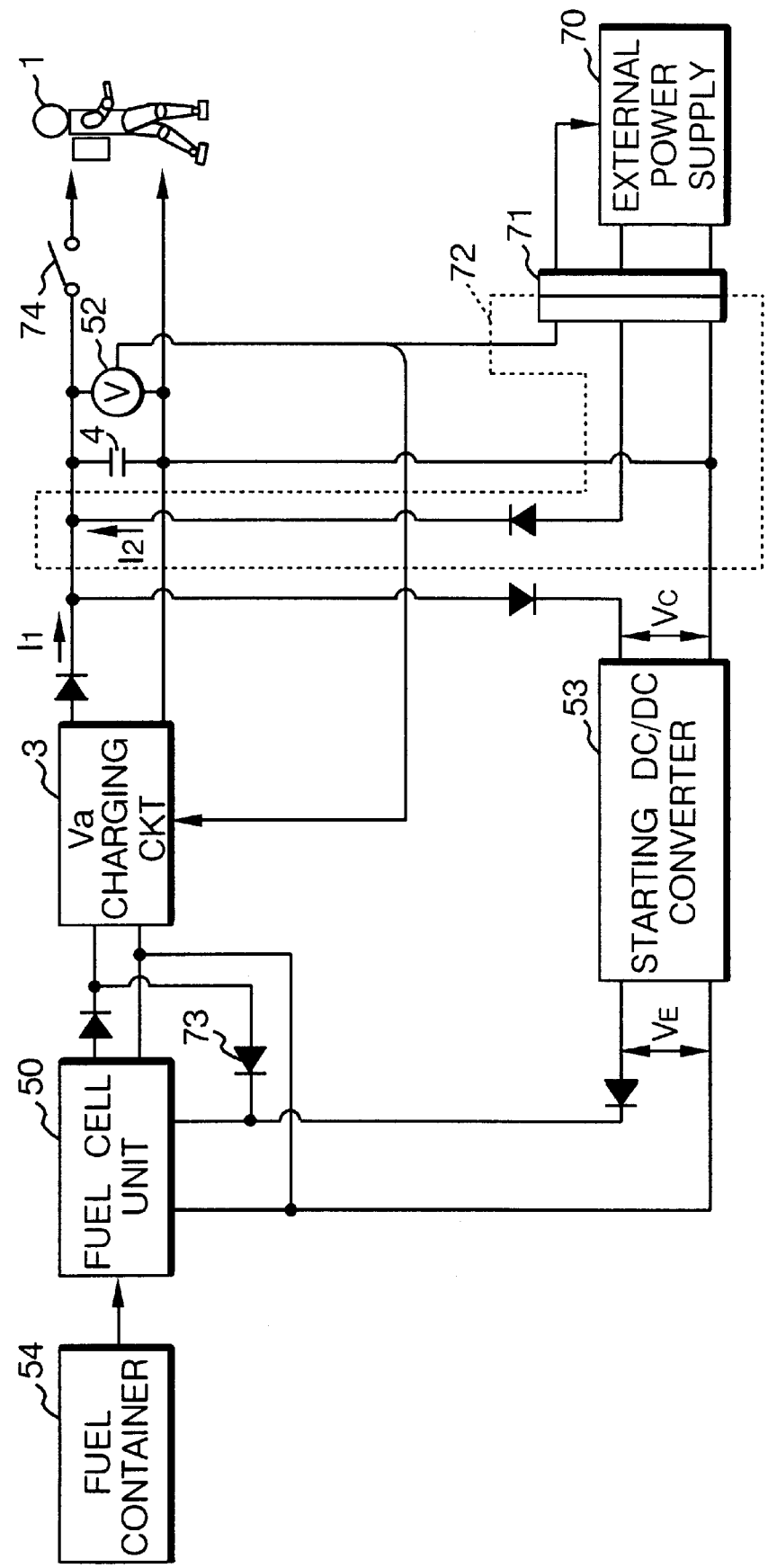
FIG. 15 is a block diagram of a control system capable of replacing a fuel container without stopping the supply of electric energy to the robot according to the first embodiment.
Figure 16:
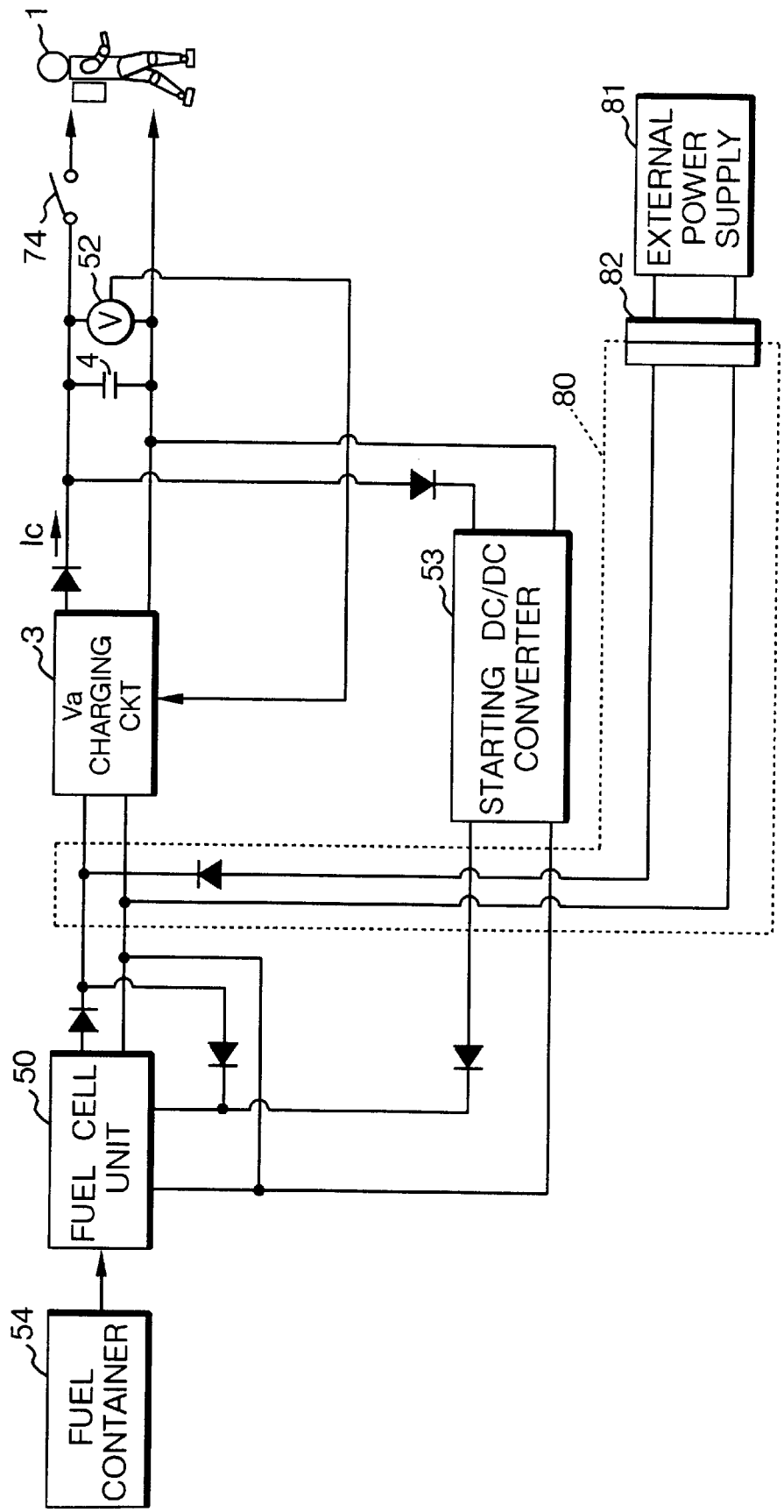
FIG. 16 is a block diagram of a control system capable of replacing a fuel container without stopping the supply of electric energy to the robot according to the second embodiment.
Figure 17:
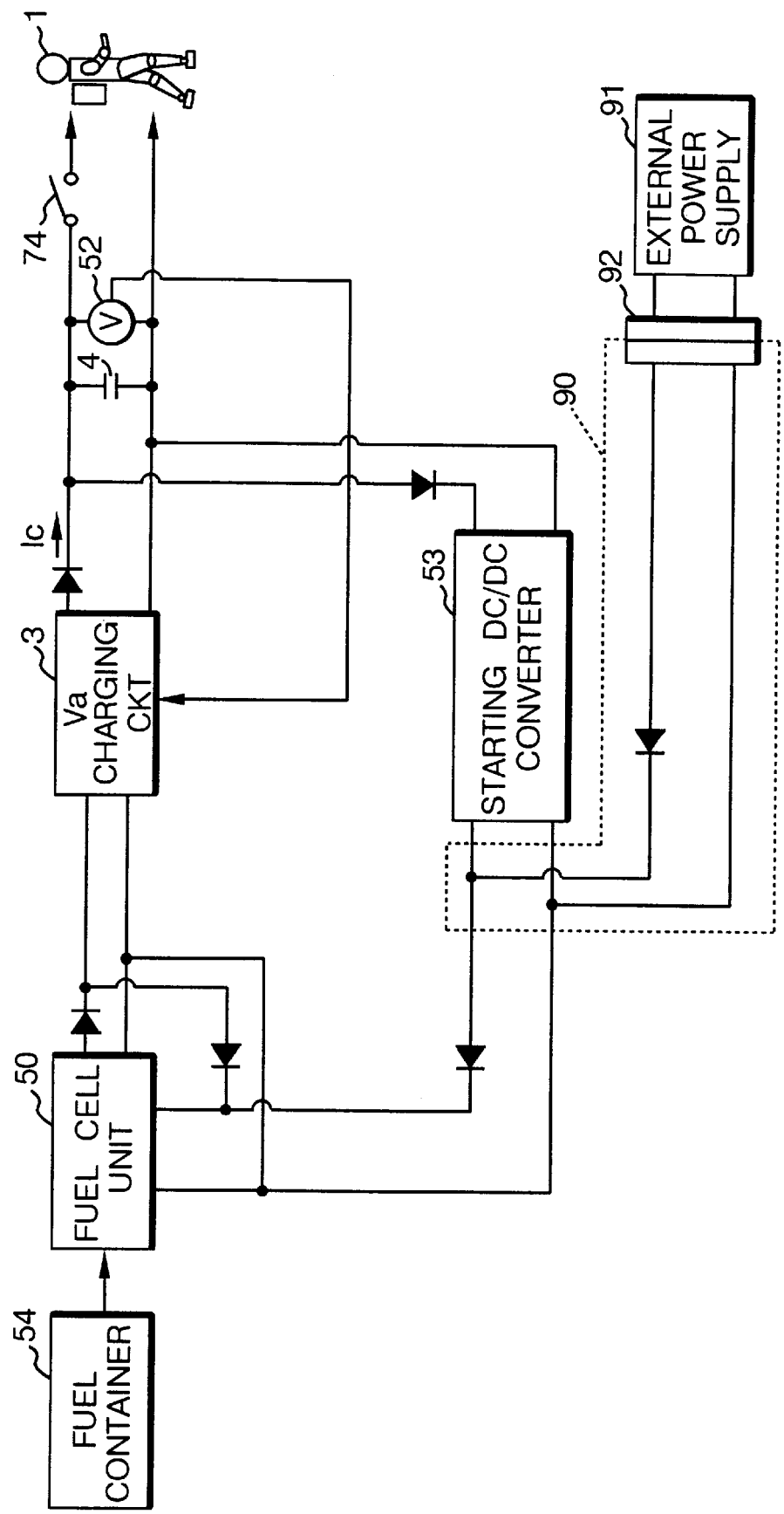
FIG. 17 is a block diagram of a control system capable of replacing a fuel container without stopping the supply of electric energy to the robot according to the third embodiment.

Control systems capable of replacing the fuel container 54 for supplying the fuel to the fuel cell unit 50 without stopping the supply of electric energy to the legged moving robot 1 will be described below with reference to FIGS. 15 through 17. FIGS. 15 through 17 show respective control systems for replacing the fuel container 54 without stopping the supply of electric energy to the legged moving robot 1 according to the first, second, and third embodiments, respectively. Those parts of the system shown in FIGS. 15 through 17 which are identical to those shown in FIGS. 1, 12, and 13 are denoted by identical reference numerals, and will not be described in detail below.

The control system capable of replacing the fuel container 54 without stopping the supply of electric energy to the legged moving robot 1 according to the first embodiment will be described below with reference to FIG. 15.

As shown in FIG. 15, the charging circuit 3 (corresponding to a charging means) generates a first charging current $I_1$ from the output electric energy of the fuel cell unit 50, and an auxiliary charging means 72 is detachably connected to an external power supply 70 to supply a second charging current $I_2$ to the electric double-layer capacitor 4.

The external power supply 70 is connected to the auxiliary charging means 72 by a power supply connector 71 only when the fuel container 54 is to be replaced. For starting the fuel cell unit 50 when the external power supply 70 is not connected, the output of the electric double-layer capacitor 4 is supplied to the DC/DC converter 53, and a lowered starting voltage $V_E$ produced by the DC/DC converter 53 is applied to the fuel cell unit 50.

When the starting voltage $V_E$ is applied to the fuel cell unit 50, as described above with reference to FIG. 13, the fuel cell 50 starts supplying electric energy to the charging circuit 3. As shown in FIG. 15, the output of the fuel cell unit 50 is supplied to the fuel cell unit 50 via a diode 73, for use as operating electric power of the fuel cell unit 50 itself.

The charging circuit 3 generates the first charging current $I_1$ for charging the electric double-layer capacitor 4 from the electric energy supplied from the fuel cell unit 50. The charging circuit 3 adjusts the magnitude of the first charging current $I_1$ to be supplied to the electric double-layer capacitor 4 so that the output voltage Vc of the electric double-layer capacitor 4 as detected by the voltage sensor 52 will be equalized to a predetermined charging reference voltage Va of 136 V, for example. Thus, the output voltage Vc of the electric double-layer capacitor 4 is maintained as the charging reference voltage Va. When an electric energy supply switch 74 is closed, the operation control means 2 (see FIG. 12), the actuator (see FIG. 12), and sensors (not shown) of the legged moving robot 1 can be operated. The charging circuit 3 has a current limiting function such that when the output voltage Vc of the electric double-layer capacitor 4 is low, the charging circuit 3 outputs a high voltage to the electric double-layer capacitor 4 to prevent an excessive charging current from being supplied to the electric double-layer capacitor 4.

A procedure for replacing the fuel container 54 will be described below with reference to FIG. 13. For replacing the fuel container 54, the first shutoff valve 62 and the second shutoff valve 64 are closed to stop the supply of hydrogen from the fuel container 54 to the fuel cell 5. Thereafter, the connector 65 is detached to remove the fuel container 54 from the fuel cell unit 50. A new fuel container 54 is connected to the fuel cell unit 50 by the connector 65, and the first shutoff valve 62 and the second shutoff valve 64 are opened to resume the supply of the fuel from the fuel container 54 to the fuel cell 5. The first shutoff valve 62 is opened and closed by a control signal outputted from the fuel cell controller 56 according to a command from the operation control means 2 (see FIG. 12). The second shutoff valve 64 is manually opened and closed by the operator.

While the fuel container 54 is being replaced, the fuel cell 5 is inactivated as no fuel is supplied thereto. Therefore, as shown in FIG. 15, the supply of electric energy from the fuel cell unit 50 to the charging circuit 3 is stopped. Thus, the first charging current $I_1$ from the charging circuit 3 is also stopped. According to the first embodiment, before the fuel container 54 is replaced, the operator connects the external power supply 70 to the auxiliary charging means 72 via the power supply connector 71, and activates the external power supply 70. The external power supply 70 is supplied with the output voltage Vc of the electric double-layer capacitor 4 as detected by the voltage sensor 52, and supplies the second charging current $I_2$ to the electric double-layer capacitor 4 in order to equalize the output voltage Vc to the charging reference voltage Va.

Even when the supply of the first charging current $I_1$ from the charging circuit 3 is stopped, the auxiliary charging means 72 supplies the second charging current $I_2$ to charge the electric double-layer capacitor 4. Accordingly, the fuel container 54 can be replaced without stopping the supply of electric energy to the legged moving robot 1.

The control system capable of replacing the fuel container 54 without stopping the supply of electric energy to the legged moving robot 1 according to the second embodiment will be described below with reference to FIG. 16.

In the first embodiment shown in FIG. 15, the control system has the auxiliary charging means 72 for supplying the second charging current $I_2$ to the electric double-layer capacitor 4. According to the second embodiment, as shown in FIG. 16, the control system has an auxiliary power supply means 80 for supplying operating electric energy to the charging circuit 3. The auxiliary power supply means 80 is connected by a power supply connector 82 to an external power supply 81 which outputs a voltage similar to the output voltage, ranging from 20 to 36 V, for example, of the fuel cell unit 50.

According to the second embodiment, for replacing the fuel container 54, the operator connects the external power supply 81 to the auxiliary power supply means 80 via the power supply connector 82, and activates the external power supply 81. Therefore, the auxiliary power supply means 80 supplies operating electric energy to the charging circuit 3. Even though the first shutoff valve 62 is closed to stop operating the fuel cell 5 and the supply of electric energy from the fuel cell unit 50 to the charging circuit 3 is stopped for the replacement of the fuel container 54, the charging circuit 3 can continuously operate with electric energy supplied from the auxiliary power supply means 80.

Even when the fuel container 54 is replaced, therefore, it is possible to supply a charging current Ic (corresponding to the first charging current referred to above) from the charging circuit 3 to the electric double-layer capacitor 4. As with the first embodiment shown in FIG. 15, the fuel container 54 can be replaced without stopping the supply of electric energy to the legged moving robot 1.

In the above first and second embodiments, the output electric energy of the electric double-layer capacitor 4 is supplied to the DC/DC converter 7. Since the output voltage Vc of the electric double-layer capacitor 4 is maintained as the charging reference voltage Va during replacement of the fuel container 54, the DC/DC converter 7 can supply restarting electric energy to the fuel cell unit 50 when the replacement of the fuel container 54 is finished. Therefore, it is not necessary to provide a dedicated auxiliary power supply or supply electric energy from an external source for restarting the fuel cell unit 50 when the replacement of the fuel container 54 is finished.

The control system capable of replacing the fuel container 54 without stopping the supply of electric energy to the legged moving robot 1 according to the third embodiment will be described below with reference to FIG. 17.

In the second embodiment shown in FIG. 16, the control system has the auxiliary power supply means 80 for supplying operating electric energy to the charging circuit 3. According to the third embodiment, the control system has an auxiliary power supply means 90 for supplying operating electric energy to the fuel cell unit 50 to activate the fuel cell unit 50. The auxiliary power supply means 90 is connected by a power supply connector 92 to an external power supply 91 which outputs a voltage similar to the output voltage of the DC/DC converter 53.

According to the third embodiment, for replacing the fuel container 54, the operator connects the external power supply 91 to the auxiliary power supply means 90 via the power supply connector 92. Therefore, the auxiliary power supply means 90 supplies operating electric energy to the fuel cell unit 50, so that the fuel cell controller 56, the compressor 60, and the cooling fan 63 can continuously operate as shown in FIG. 13.

In FIG. 13, when the first shutoff valve 62 is closed to stop supply the fuel to the fuel cell 5 in order to replace the fuel container 54, the fuel remains in the fuel cell 5. Until the remaining fuel in the fuel cell 5 is fully consumed, the fuel cell unit 50 continuously supplies electric energy to the charging circuit 3. When the remaining fuel in the fuel cell 5 is fully consumed and the fuel cell 5 stops outputting electric energy, the electric energy supplied from the auxiliary power supply means 90 is supplied directly or via a transformer to the charging circuit 3, which can thus continuously charge the electric double-layer capacitor 4.

As with the first and second embodiments, the fuel container 54 can be replaced without stopping the supply of electric energy to the legged moving robot 1. When the replacement of the fuel container 54 is finished, the fuel cell 5 can be restarted by the operating electric power supplied from the auxiliary power supply means 90 to the fuel cell unit 50.

Each of the control systems capable of replacing the fuel container 54 without stopping the supply of electric energy to the legged moving robot 1 according to the first, second, and third embodiments shown in FIGS. 15, 17, and 17 employs the electric double-layer capacitor 4 as the electric energy storage means. However, another type of capacitor may be employed. If a capacitor having a high natural discharging rate is used as the electric energy storage means, then it is particularly effective in offering the advantages of the present invention. However, the advantages of the present invention can also be achieved if a secondary battery such as a nickel-cadmium battery, a lithium-ion battery, or the like is used as the electric energy storage means.

Although certain preferred embodiments of the present invention have been shown and described in detail, it should be understood that various changes and modifications may be made therein without departing from the scope of the appended claims.

What is claimed is:

1. A legged moving robot having an action plan function to operate according to a predetermined action plan, comprising:

a fuel cell for supplying operating electric energy for the legged moving robot;

operation control means for controlling operation of the legged moving robot according to the action plan; and electric generation managing means for monitoring a state of said fuel cell and contents of the action plan and for regulating an amount of electric energy generated by said fuel cell depending on the action plan.

2. A legged moving robot according to claim 1, further comprising:

raw material storage means for storing a raw material from which to generate a fuel for said fuel cell; and a reformer for generating the fuel for said fuel cell from the raw material supplied from said raw material storage means and supplying the generated fuel to said fuel cell;

said electric generation managing means comprising means for directing a change in an amount of the fuel to be generated to said reformer depending on an amount of the fuel consumed by said fuel cell, analyzing the contents of the action plan before the action plan is executed, and, if it is recognized from the action plan that the legged moving robot will operate under a large load requiring at least a predetermined level of electric energy from said fuel cell, carrying out an anticipatory process to direct said reformer to increase the amount of the fuel to be generated thereby before the legged moving robot operates under the large load.

3. A legged moving robot according to claim 2, further comprising:

a reservoir tank for storing the fuel generated by said reformer and supplying the fuel to said fuel cell;

said electric generation managing means comprising means for carrying out said anticipatory process so that a pressure in said reservoir tank will not exceed a predetermined upper pressure limit.

4. A legged moving robot according to claim 2, wherein said electric generation managing means comprising means for determining, depending on at least reaction delay characteristics of said reformer, a preparation time estimated after said reformer is directed to increase the amount of the fuel to be generated thereby so that the amount of the fuel supplied from said reformer to said fuel cell will be at least a required amount depending on the operation of the legged moving robot under the large load, until a target amount of the fuel established depending on said required amount is actually generated by said reformer, and directing said operation control means to start operating the legged moving robot under the large load upon elapse of said preparation time after said reformer is directed to increase the amount of the fuel to be generated thereby.

5. A legged moving robot according to claim 2, further comprising:

generated fuel amount grasping means for grasping an amount of the fuel generated by said reformer;

said electric generation managing means comprising means for determining an extent to which said reformer is directed to increase the amount of the fuel to be generated thereby, depending on at least the amount of the fuel generated by said reformer as grasped by said generated fuel amount grasping means in said anticipatory process for supplying said required amount of the fuel.

6. A legged moving robot according to claim 5, wherein said generated fuel amount grasping means comprises means for grasping the amount of the fuel generated by said reformer from the amount of electric energy generated by said fuel cell, a temperature in said reformer, and a pressure at which the fuel is supplied from said reformer.

7. A legged moving robot according to claim 2, further comprising:

generated fuel amount grasping means for grasping an amount of the fuel generated by said reformer;

said electric generation managing means comprising means for directing said reformer to increase the amount of the fuel generated thereby so that the amount of the fuel supplied from said reformer to said fuel cell will be at least a required amount depending on the operation of the legged moving robot under the large load, and directing said operation control means to start operating the legged moving robot under the large load when the amount of the fuel generated by said reformer as grasped by said generated fuel amount grasping means reaches at least a target amount of the fuel established depending on said required amount after said reformer is directed to increase the amount of the fuel generated thereby in said anticipatory process.

8. A legged moving robot according to claim 7, wherein said generated fuel amount grasping means comprises means for grasping the amount of the fuel generated by said reformer from the amount of electric energy generated by said fuel cell, a temperature in said reformer, and a pressure at which the fuel is supplied from said reformer.

9. A legged moving robot according to claim 7, wherein said electric generation managing means comprising means for directing said reformer to increase the amount of the fuel generated thereby so that the amount of the fuel supplied from said reformer to said fuel cell will be at least a required amount depending on the operation of the legged moving robot under the large load, thereafter calculating a preparation time estimated until said target amount of the fuel established depending on said required amount is actually generated by said reformer, and directing said operation control means to start operating the legged moving robot under the large load when the amount of the fuel generated by said reformer as grasped by said generated fuel amount grasping means reaches at least said target amount of the fuel or when said preparation time has elapsed after said reformer is directed to increase the amount of the fuel generated there by in said anticipatory process.

10. A legged moving robot according to claim 9, wherein said generated fuel amount grasping means comprises means for grasping the amount of the fuel generated by said reformer from the amount of electric energy generated by said fuel cell, a temperature in said reformer, and a pressure at which the fuel is supplied from said reformer.

11. A legged moving robot according to claim 1, further comprising:

electric energy storage means for being charged by the electric energy outputted from said fuel cell and supplying the operating electric energy.

12. A legged moving robot according to claim 11, further comprising:

fuel supply means for supplying a fuel to said fuel cell;

fuel cell starting means for starting to activate said fuel cell; and charging means for generating a charging current from output electric energy from said fuel cell and charging said electric energy storage means with said charging current;

said fuel cell starting means comprising means for starting to activate said fuel cell with output electric energy from said electric energy storage means;

said operation control means comprising means for stopping supplying the operating electric energy from said electric energy storage means to the legged moving robot after said electric energy storage means is charged up to a reference voltage close to a maximum rated voltage of said electric energy storage means by said charging means, when said fuel cell is to stop operating to finish operation of the legged moving robot.

13. A legged moving robot according to claim 12, wherein said electric energy storage means comprises a capacitor.

14. A legged moving robot according to claim 11, further comprising:

fuel supply means detachably connected to said fuel cell, for supplying a fuel to said fuel cell;

charging means for generating a first charging current from output electric energy from said fuel cell and charging said electric energy storage means with said first charging current;

an external power supply for generating a second charging current; and auxiliary charging means detachably connected to said external power supply, for charging said electric energy storage means with the second charging current from said external power supply.

15. A legged moving robot according to claim 14, wherein said fuel cell starts being activated by output electric energy from said electric energy storage means.

16. A legged moving robot according to claim 11, further comprising:

fuel supply means detachably connected to said fuel cell, for supplying a fuel to said fuel cell;

charging means for generating a charging current from output electric energy from said fuel cell and charging said electric energy storage means with said charging current;

an external power supply for supplying electric energy; and auxiliary power supply means detachably connected to said external power supply, for operating said charging means with the electric energy supplied from said external power supply to generate said charging current.

17. A legged moving robot according to claim 11, further comprising:

fuel supply means detachably connected to said fuel cell, for supplying a fuel to said fuel cell;

charging means for generating a charging current from output electric energy from said fuel cell and charging said electric energy storage means with said charging current;

an external power supply for supplying electric energy; and auxiliary power supply means detachably connected to said external power supply, for activating said fuel cell with the electric energy supplied from said external power supply.

* * * * *